(12) United States Patent
Yoda et al.

(10) Patent No.: US 7,361,390 B2
(45) Date of Patent: Apr. 22, 2008

(54) LIQUID CRYSTAL PANEL AND LIQUID CRYSTAL DISPLAY APPARATUS

(75) Inventors: Kenji Yoda, Osaka (JP); Shuuji Yano, Osaka (JP); Naoki Koishi, Osaka (JP); Masaki Hayashi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 274 days.

(21) Appl. No.: 11/228,476

(22) Filed: Sep. 19, 2005

(65) Prior Publication Data

US 2006/0066787 A1    Mar. 30, 2006

(30) Foreign Application Priority Data

Sep. 29, 2004 (JP) .............................. 2004-283823
May 24, 2005 (JP) .............................. 2005-150310

(51) Int. Cl.
    *G02F 1/13363* (2006.01)
(52) U.S. Cl. .................... 428/1.3; 428/1.1; 349/118
(58) Field of Classification Search ................ 428/1.1, 428/1.3; 349/117, 118, 119, 120, 121
    See application file for complete search history.

(56) References Cited

U.S. PATENT DOCUMENTS

| | | | |
|---|---|---|---|
| 6,184,957 B1 | 2/2001 | Mori et al. | |
| 6,937,307 B1 * | 8/2005 | Ito et al. | 349/117 |
| 7,075,604 B2 | 7/2006 | Yano et al. | |
| 2002/0005925 A1 * | 1/2002 | Arakawa | 349/117 |
| 2003/0210370 A1 | 11/2003 | Yano et al. | |
| 2004/0057141 A1 * | 3/2004 | Sekiguchi et al. | 359/883 |
| 2004/0125291 A1 * | 7/2004 | Kawahara et al. | 349/117 |
| 2005/0014913 A1 * | 1/2005 | Kim et al. | 526/90 |
| 2005/0062917 A1 | 3/2005 | Kashima | |

FOREIGN PATENT DOCUMENTS

| | | |
|---|---|---|
| CN | 1448734 A | 10/2003 |
| EP | 1791005 A1 * | 5/2007 |
| JP | 4-305602 | 10/1992 |
| JP | 5-157911 | 6/1993 |

(Continued)

OTHER PUBLICATIONS

Chinese Office Action dated Oct. 12, 2007 (mailing date), issued in corresponding Chinese Patent Application No. 2005101080220.

*Primary Examiner*—D. Lawrence Tarazano
*Assistant Examiner*—Jason A Sese
(74) *Attorney, Agent, or Firm*—Westerman, Hattori, Daniels & Adrian, LLP.

(57) ABSTRACT

A liquid crystal panel having improved contrast ratio in an oblique direction and good display evenness without causing shift or unevenness in retardation values due to shrinkage stress of a polarizer or heat of backlight is provided.

A liquid crystal panel according to an embodiment of the present invention includes: a liquid crystal cell; a polarizer arranged on both sides of the liquid crystal cell; a first optical element arranged between one polarizer and the liquid crystal cell; and a second optical element arranged between the other polarizer and the liquid crystal cell, wherein: the first optical element comprises a retardation film containing a norbornene-based resin and satisfying the following expressions (1) and (2); and the second optical element has substantially optical isotropy:

$$240 \text{ nm} \leq Re[590] \leq 350 \text{ nm} \tag{1}$$

$$0.20 \leq Rth[590]/Re[590] \leq 0.80. \tag{2}$$

19 Claims, 11 Drawing Sheets

FOREIGN PATENT DOCUMENTS

| | | |
|---|---|---|
| JP | 08-015691 A | 1/1996 |
| JP | 10054982 A * | 2/1998 |
| JP | 10-170909 A | 6/1998 |
| JP | 11-305217 | 5/1999 |
| JP | 2001-174632 A | 6/2001 |
| JP | 2001-215332 | 8/2001 |
| JP | 2004-004641 A | 1/2004 |
| JP | 2004-038064 A | 2/2004 |
| JP | 2004110003 A * | 4/2004 |
| JP | 2004-272202 A | 9/2004 |
| JP | 2004-326089 A | 11/2004 |

* cited by examiner

LIQUID CRYSTAL PANEL AND LIQUID CRYSTAL DISPLAY APPARATUS

BACKGROUND OF THE INVENTION

1. Field of the Invention

The present invention relates to a liquid crystal panel having a liquid crystal cell, a polarizer, and an optical element. Further, the present invention relates to a liquid crystal television and a liquid crystal display apparatus each using the liquid crystal panel.

2. Description of the Related Art

A liquid crystal display apparatus provided with a liquid crystal cell of in-plane switching (IPS) mode involves control of light transmittance (white display) and light shielding (black display) through application of an electric field in a horizontal direction on liquid crystal molecules aligned in a substantially horizontal direction without application of the electric field to rotate the liquid crystal molecules by about 45°. A conventional liquid crystal display apparatus provided with a liquid crystal cell of IPS mode has a problem in that a contrast ratio of a screen viewed from an oblique direction at an angle of 45° (azimuth angle of 45°, 135°, 225°, or 315°) with respect to an absorption axis of a polarizer degrades.

There is disclosed a technique for solving the problem involving use of a λ/2 plate exhibiting a refractive index profile of nx>nz>ny (wherein, nx, ny, and nz respectively represent refractive indices in a slow axis direction, fast axis direction, and thickness direction of a film) for improving display properties in an oblique direction (JP 11-305217 A, for example). However, the disclosed technique provides insufficient improvement in contrast ratio in an oblique direction and color shift in an oblique direction, and further improvement in display properties is desired.

An aromatic polymer film such as a polycarbonate-based resin, a polyarylate-based resin, or a polyester-based resin had been heretofore used as the λ/2 plate exhibiting a refractive index profile of nx>nz>ny (JP 04-305602 A or JP 05-157911 A, for example). However, the aromatic polymer film has a large photoelastic coefficient and its retardation values may vary easily by stress. Thus, the aromatic polymer film has a problem in that display evenness degrades as described below. In a case where the aromatic polymer film attached between a liquid crystal cell and a polarizer is exposed to high temperatures, retardation values may depart from designed values due to shrinkage stress of the polarizer. Further, uneven stress generated by heat of backlight may cause unevenness in retardation values.

Meanwhile, an aliphatic resin film such as a norbornene-based resin film has a small photoelastic coefficient. However, the aliphatic resin film hardly causes retardation, and desired retardation values cannot be obtained through stretching at a low stretch ratio as in the aromatic polymer film, or even at a high stretch ratio. The stretching at a high stretch ratio causes a problem of breaking of the film. As a result, a retardation film which is an aliphatic resin film having a small photoelastic coefficient and a relationship of nx≧ny>nz has been obtained through a conventional technique (JP 2001-215332 A, for example), but no retardation film having a relationship of nx>nz>ny has been hitherto obtained.

SUMMARY OF THE INVENTION

The present invention has been made in view of solving the above problems, and an object of the present invention is to provide a liquid crystal panel having a liquid crystal cell with improved contrast ratio in an oblique direction. Another object of the present invention is to provide a liquid crystal panel and a liquid crystal display apparatus each having a liquid crystal cell with good display evenness without causing shift or unevenness in retardation values due to shrinkage stress of a polarizer or heat of backlight.

A liquid crystal panel according to an embodiment of the invention includes: a liquid crystal cell; a polarizer arranged on both sides of the liquid crystal cell; a first optical element arranged between one polarizer and the liquid crystal cell; and a second optical element arranged between the other polarizer and the liquid crystal cell, wherein: the first optical element comprises a retardation film containing a norbornene-based resin satisfying the following expressions (1) and (2); and the second optical element has substantially optical isotropy:

$$240 \text{ nm} \leq Re[590] \leq 350 \text{ nm} \quad (1)$$

$$0.20 \leq Rth[590]/Re[590] \leq 0.80 \quad (2).$$

In one embodiment of the invention, the first optical element has a slow axis which is one of substantially parallel and substantially perpendicular to an absorption axis of one polarizer.

In another embodiment of the invention, the liquid crystal cell includes a liquid crystal layer containing homogeneously aligned liquid crystal molecules in the absence of an electric field.

In still another embodiment of the invention, the liquid crystal cell has a refractive index profile of nx>ny=nz.

In still another embodiment of the invention, the liquid crystal cell includes one of IPS mode, FFS mode, and FLC mode.

In still another embodiment of the invention, an initial alignment direction of the liquid crystal cell is substantially parallel to a direction of an absorption axis of the polarizer on a side where the second optical element is arranged.

In still another embodiment of the invention, the initial alignment direction of the liquid crystal cell is substantially parallel to a direction of an absorption axis of the polarizer arranged on a backlight side of the liquid crystal cell.

In still another embodiment of the invention, the initial alignment direction of the liquid crystal cell is substantially perpendicular to a direction of an absorption axis of the polarizer arranged on a backlight side of the liquid crystal cell.

In still another embodiment of the invention, the first optical element has wavelength dispersion property of 0.81 to 1.10.

In still another embodiment of the invention, the first optical element includes a single retardation film containing a norbornene-based resin.

Alternatively, the first optical element includes a laminate including the retardation film containing a norbornene-based.

In still another embodiment of the invention, the norbornene-based resin contains a ring-opened polymer and/or ring-opened copolymer of a norbornene-based monomer.

In still another embodiment of the invention, the norbornene-based resin contains a resin obtained through hydrogenation of the ring-opened polymer or ring-opened copolymer of the norbornene-based monomer and containing at least repeating units represented by the general formulae (I), (II), and/or (III):

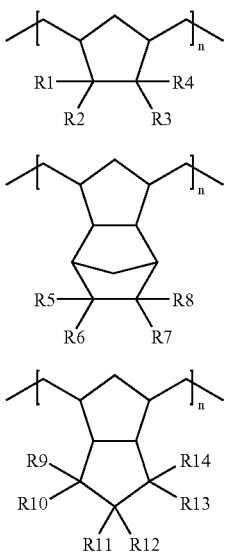

in the general formulae (I), (II), and (III): R1 to R14 each independently represent hydrogen, a halogen, a halogenated alkyl group, an alkyl group having 1 to 4 carbon atoms, an alkylidene group having 1 to 4 carbon atoms, an alkenyl group having 1 to 4 carbon atoms, an alkoxycarbonyl group having 1 to 4 carbon atoms, an aryl group, an aralkyl group, an aralkyloxy group, a hydroxyalkyl group, a cyano group, a cycloalkyl group having 4 to 10 carbon atoms, an acyloxy group, or substituted derivatives thereof; and n represents an integer of 2 or more.

In still another embodiment of the invention, the retardation film has an absolute value of photoelastic coefficient measured by using light of a wavelength of 590 nm at 23° C. of $2.0 \times 10^{-13}$ to $2.0 \times 10^{-11}$ m$^2$/N.

In still another embodiment of the invention, the second optical element satisfies the following expressions (3) and (4):

$$0 \text{ nm} \leq Re[590] \leq 10 \text{ nm} \tag{3}$$

$$-10 \text{ nm} \leq Rth[590] \leq 20 \text{ nm} \tag{4}.$$

In still another embodiment of the invention, the second optical element includes at least one polymer film selected from the group consisting of a cellulose-based resin, a norbornene-based resin, and a resin containing an alternating copolymer of isobutylene and N-methylmaleimide and an acrylonitrile/styrene copolymer.

In still another embodiment of the invention, the second optical element includes a laminate film prepared by laminating a negative C plate satisfying the following expressions (7) and (8), and a positive C plate satisfying the following expressions (9) and (10):

$$0 \text{ nm} < Re[590] \leq 10 \text{ nm} \tag{7}$$

$$20 \text{ nm} < Rth[590] \leq 400 \text{ nm} \tag{8}$$

$$0 \text{ nm} < Re[590] \leq 10 \text{ mm} \tag{9}$$

$$-400 \text{ nm} \leq Rth[590] < -20 \text{ nm} \tag{10}.$$

In still another embodiment of the invention, the liquid crystal panel further includes a protective film on an outer side of each polarizer.

According to another aspect of the invention, a liquid crystal television is provided. The liquid crystal television includes the above-mentioned liquid crystal panel.

According to still another aspect of the invention, a liquid crystal display apparatus is provided. The liquid crystal display apparatus includes the above-mentioned liquid crystal panel.

The liquid crystal panel of the present invention is provided with: the first optical element satisfying the below-indicated expressions (1) and (2) arranged between one polarizer and the liquid crystal cell; and the second optical element having substantially optical isotropy arranged between the other polarizer and the liquid crystal cell, to thereby enhance a contrast ratio of the liquid crystal display apparatus in an oblique direction. The first optical element of the present invention including the retardation film containing a norbornene-based resin has a small photoelastic coefficient, to thereby prevent unevenness in retardation values due to shrinkage stress of the polarizer or heat of backlight of the liquid crystal panel. No retardation film having a small photoelastic coefficient and having a refractive index profile of nx>nz>ny has been hitherto obtained. However, in the present invention, a shrinkable film having a predetermined shrinkage ratio is attached to one side or both sides of a polymer film containing a norbornene-based resin and the resultant is heat stretched, to thereby provide a retardation film having a small photoelastic coefficient and a refractive index profile of nx>nz>ny and satisfying the below-indicated expressions (1) and (2). As a result, good display properties of the liquid crystal display apparatus can be maintained for a long period of time.

$$240 \text{ nm} \leq Re[590] \leq 350 \text{ nm} \tag{1}$$

$$0.20 \leq Rth[590]/Re[590] \leq 0.80 \tag{2}$$

(In the expressions (1) and (2), Re[590] and Rth[590] respectively represent in-plane retardation and thickness direction retardation values of the film measured by using light of a wavelength of 590 nm at 23° C.)

DESCRIPTION OF THE PREFERRED EMBODIMENTS

A. Outline of Entire Liquid Crystal Panel

Figure 1:
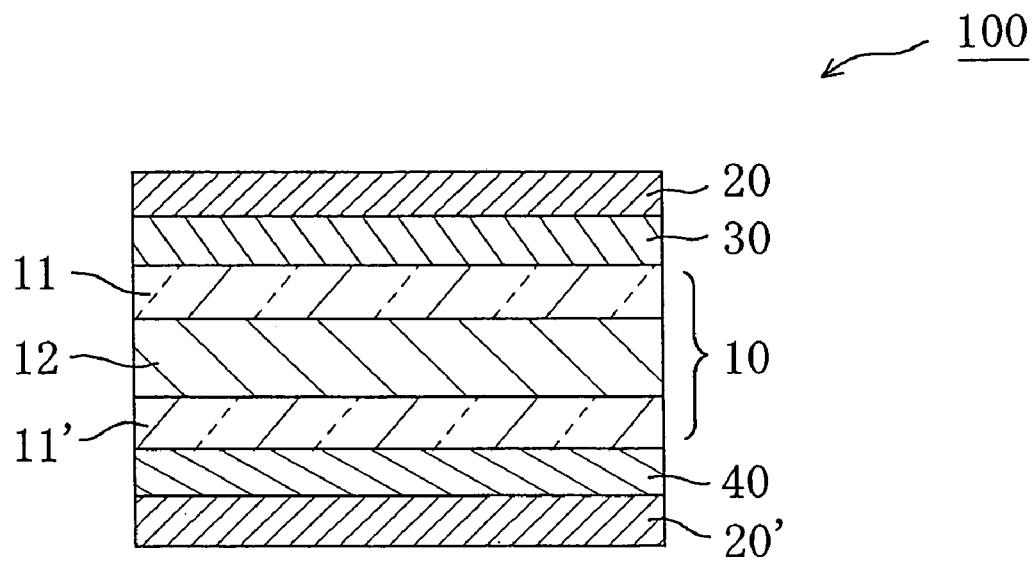
FIG. 1 is a schematic sectional view of a liquid crystal panel according to a preferred embodiment of the present invention.
Figure 2A:
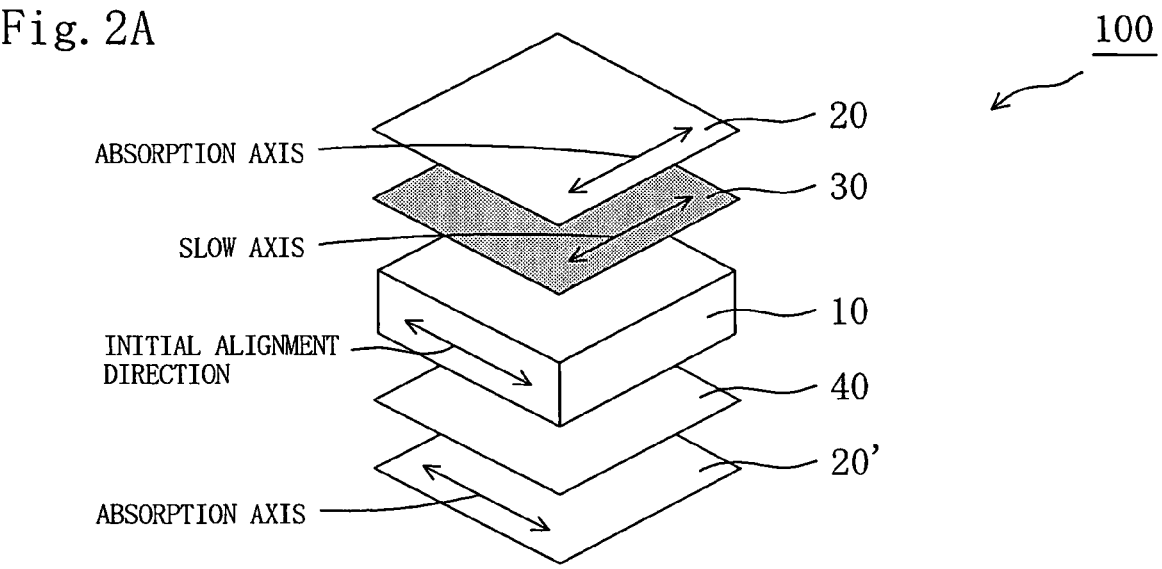
FIG. 2A is a schematic perspective view of the liquid crystal panel of FIG. 1.
Figure 2B:
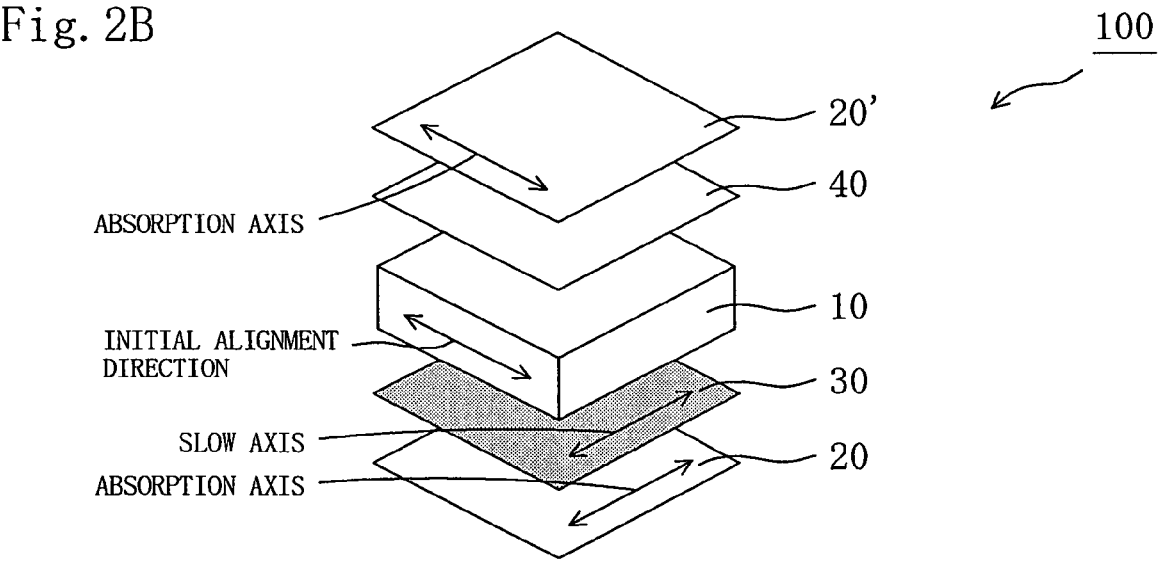
FIG. 2B is a schematic perspective view of a liquid crystal panel according to another preferred embodiment of the present invention.

FIG. 1 is a schematic sectional view of a liquid crystal panel according to a preferred embodiment of the present invention. FIG. 2A is a schematic perspective view of a liquid crystal panel of O-mode, and FIG. 2B is a schematic perspective view of a liquid crystal panel of E-mode. Note that, ratios among length, width, and thickness of each member in FIGS. 1, 2A, and 2B are different from those of an actual member for clarity. A liquid crystal panel 100 is provided with: a liquid crystal cell 10; polarizers 20 and 20' arranged on both sides of the liquid crystal cell 10; a first optical element 30 arranged between one polarizer (polarizer 20 in FIGS. 1, 2A, and 2B) and the liquid crystal cell 10; and a second optical element 40 arranged between the other polarizer (polarizer 20' in FIGS. 1, 2A, and 2B) and the liquid crystal cell 10. For practical use, any appropriate protective films (not shown) may be arranged on outer sides of the polarizers 20 and 20'. FIGS. 1, 2A, and 2B each show a case where a slow axis of the first optical element 30 and an absorption axis of the polarizer 20 are parallel to each other, and a slow axis of the second optical element 40 (when detected) and an absorption axis of the polarizer 20' are parallel to each other. However, the slow axis of the first optical element 30 and the absorption axis of the polarizer 20 may be perpendicular to each other, and the slow axis of the second optical element 40 (when detected) and the absorption axis of the polarizer 20' may be perpendicular to each other. The first optical element includes a retardation film containing a norbornene-based resin and satisfying the below-indicated expressions (1) and (2), and the second optical element has substantially optical isotropy.

$$240 \text{ nm} \leq Re[590] \leq 350 \text{ nm} \quad (1)$$

$$0.20 \leq Rth[590]/Re[590] \leq 0.80 \quad (2)$$

(In the expressions (1) and (2), Re[590] and Rth[590] respectively represent in-plane retardation and thickness direction retardation values of the film measured by using light of a wavelength of 590 nm at 23° C.)

The polarizer 20' (i.e., the polarizer adjacent to the second optical element 40) is preferably arranged such that its absorption axis is substantially parallel to an initial alignment direction of the liquid crystal cell 10. The polarizer 20 is preferably arranged such that its absorption axis is substantially perpendicular to the initial alignment direction of the liquid crystal cell 10.

The liquid crystal panel of the present invention may be of so-called O-mode or so-called E-mode. The term "liquid crystal panel of O-mode" refers to a liquid crystal panel in which an absorption axis of a polarizer arranged on a backlight side of a liquid crystal cell and an initial alignment direction of the liquid crystal cell are parallel to each other. The term "liquid crystal panel of E-mode" refers to a liquid crystal panel in which an absorption axis of a polarizer arranged on a backlight side of a liquid crystal and an initial alignment direction of the liquid crystal cell are perpendicular to each other. In the liquid crystal panel of O-mode as shown in FIG. 2A, the polarizer 20 and the first optical element 30 are preferably arranged on a viewer side of the liquid crystal cell 10, and the second optical element 40 and the polarizer 20' are preferably arranged on a backlight side of the liquid crystal cell 10. In the liquid crystal panel of E-mode as shown in FIG. 2B, the polarizer 20 and the first optical element 30 are preferably arranged on a backlight side of the liquid crystal panel 10, and the second optical element 40 and the polarizer 20' are preferably arranged on a viewer side of the liquid crystal cell 10. In the present invention, a liquid crystal panel of O-mode as shown in FIG. 2A is preferred because an arrangement of O-mode can realize better optical compensation. To be specific, in the arrangement of O-mode, the first optical element including the retardation film is arranged on a far side from backlight and thus hardly receives adverse effects due to heat of backlight, to thereby provide a liquid crystal display apparatus with little display unevenness. Hereinafter, detailed description will be given of components of the liquid crystal panel according to the present invention.

B. Liquid Crystal Cell

Referring to FIG. 1, the liquid crystal cell 10 used in the liquid crystal panel of the present invention is provided with: a pair of substrates 11 and 11'; and a liquid crystal layer 12 as a display medium arranged between the substrates 11 and 11'. One substrate (color filter substrate) 11 is provided with color filters and black matrix (both not shown). The other substrate (active matrix substrate) 11' is provided with: a switching element (typically TFT, not shown) for controlling electrooptic properties of liquid crystals; a scanning line (not shown) for providing a gate signal to the switching element and a signal line (not shown) for providing a source signal thereto; and a pixel electrode and a counter electrode (either not shown). The color filters maybe provided in the active matrix substrate 11' as well. A distance (cell gap) between the substrates 11 and 11' is controlled by a spacer (not shown). An alignment film (not shown) formed of, for example, polyimide is provided on a side of each of the substrates 11 and 11' in contact with the liquid crystal layer 12.

The liquid crystal layer 12 preferably includes homogeneously aligned liquid crystals in the absence of an electric field. The liquid crystal layer (eventually, liquid crystal cell) generally exhibits a refractive index profile of nx>ny=nz (wherein, nx, ny, and nz respectively represent refractive indices in a slow axis direction, fast axis direction, and thickness direction of a film) In the specification of the present invention, ny=nz includes not only a case where ny and nz are perfectly equal, but also a case where ny and nz are substantially equal. Further, the phrase "initial alignment direction of the liquid crystal cell" refers to a direction providing a maximum in-plane refractive index of the liquid crystal layer by alignment of nematic liquid crystal molecules in the liquid crystal layer in the absence of an electric field. Typical examples of drive mode using the liquid crystal layer exhibiting such refractive index profile include: in-plane switching (IPS) mode; fringe field switching (FFS)

mode; and ferroelectric liquid crystal (FLC) mode. Specific examples of liquid crystals used for those drive modes include nematic liquid crystals and smectic liquid crystals. For example, the nematic crystals are used for the IPS mode and the FFS mode, and the smectic liquid crystals are used for the FLC mode.

In the IPS mode, homogeneously aligned nematic liquid crystals in the absence of an electric field respond in an electric field parallel to substrates (also referred to as a horizontal electric field) generated between a counter electrode and a pixel electrode each formed of metal, for example, by utilizing an electrically controlled birefringence (ECB) effect. To be specific, as described in "Monthly Display July" (p. 83 to p. 88, published by Techno Times Co., Ltd., 1997) or "Ekisho vol. 2, No. 4" (p. 303 to p. 316, published by Japanese Liquid Crystal Society, 1998), normally black mode provides completely black display in the absence of an electric field by: aligning an alignment direction of the liquid crystal cell with an absorption axis of one polarizer in the absence of application of an electric field; and arranging the polarizing plates above and below the liquid crystal cell to be perpendicular to each other. Under application of an electric field, liquid crystal molecules rotate while remaining parallel with substrates, to thereby obtain a transmittance in accordance with a rotation angle. The IPS mode includes super in-plane switching (S-IPS) mode and advanced super in-plane switching (AS-IPS) mode employing a V-shaped electrode, a zigzag electrode, or the like. Examples of a commercially available liquid crystal display apparatus of IPS mode include: 20-inch wide liquid crystal television "Wooo" (trade name, manufactured by Hitachi, Ltd.); 19-inch liquid crystal display "ProLite E481S-1" (trade name, manufactured by Iiyama Corporation); and 17-inch TFT liquid crystal display "FlexScan L565" (trade name, manufactured by Eizo Nanao Corporation).

In the FFS mode, homogeneously aligned nematic liquid crystals in the absence of an electric field respond in an electric field parallel to substrates (also referred to as a horizontal electric field) and generated between a counter electrode and a pixel electrode each formed of transparent conductor, for example, by utilizing an electrically controlled birefringence (ECB) effect. The horizontal electric field in FFS mode is referred to as a fringe electric field, which can be generated by setting a distance between the counter electrode and the pixel electrode each formed of transparent conductor narrower than a cell gap. To be specific, as described in "Society for Information Display (SID) 2001 Digest" (p. 484 to p. 487) or JP 2002-031812 A, normally black mode provides completely black display in the absence of an electric field by: aligning an alignment direction of the liquid crystal cell with an absorption axis of one polarizer in the absence of application of an electric field; and arranging polarizing plates above and below the liquid crystal cell to be perpendicular to each other. Under application of an electric field, liquid crystal molecules rotate while remaining parallel with substrates, to thereby obtain a transmittance in accordance with a rotation angle. The FFS mode includes advanced fringe field switching (A-FFS) mode or ultra fringe field switching (U-FFS) mode employing a V-shaped electrode, a zigzag electrode, or the like. An example of a commercially available liquid crystal display apparatus of FFS mode includes Tablet PC "M1400" (trade name, manufactured by Motion Computing, Inc.).

The FLC mode utilizes property of ferroelectric chiral smectic liquid crystals encapsulated between electrode substrates each having a thickness of about 1 to 2 μm to exhibit two states of stable molecular alignment, for example. To be specific, the ferroelectric chiral smectic liquid crystal molecules rotate within a plane parallel to the substrates and respond due to application of a voltage. The FLC mode can provide black and white displays based on the same principle as those of the IPS mode and the FFS mode. The FLC mode has such a feature in that a response speed is high compared with those in other drive modes. In the specification of the present invention, the FLC mode includes: surface stabilized ferroelectric liquid crystal (SS-FLC) mode; antiferroelectric liquid crystal (AFLC) mode; polymer stabilized ferroelectric liquid crystal (PS-FLC) mode; and V-shaped switching ferroelectric liquid crystal (V-FLC) mode.

The homogeneously aligned nematic liquid crystals are obtained as a result of interaction between substrates subjected to alignment treatment and nematic liquid crystal molecules, in which alignment vectors of the nematic liquid crystal molecules are parallel to a substrate plane and uniformly aligned. In the specification of the present invention, homogenous alignment includes a case where the alignment vectors are slightly inclined with respect to the substrate plane, that is, a case where the nematic liquid crystal molecules are pretilted. In a case where the nematic liquid crystals are pretilted, a pretilt angle is preferably 20° or less for maintaining a large contrast ratio and obtaining good display properties.

Any appropriate nematic liquid crystals may be employed as the nematic liquid crystals in accordance with the purpose. The nematic liquid crystals may have positive dielectric anisotropy or negative dielectric anisotropy. A specific example of the nematic liquid crystals having positive dielectric anisotropy includes "ZLI-4535" (trade name, manufactured by Merck Ltd., Japan). A specific example of the nematic liquid crystals having negative dielectric anisotropy includes "ZLI-2806" (trade name, manufactured by Merck Ltd., Japan). A difference between an ordinary refractive index (no) and an extraordinary refractive index (ne), that is, a birefringence ($\Delta n_{LC}$) can be appropriately set in accordance with response speed of the liquid crystals, transmittance, and the like. However, the birefringence is preferably 0.05 to 0.30, in general.

Any appropriate smectic liquid crystals may be employed as the smectic liquid crystals in accordance with the purpose. The smectic liquid crystals to be used preferably have an asymmetric carbon atom in a part of a molecular structure and exhibit ferroelectric property (also referred to as ferroelectric liquid crystals). Specific examples of the smectic liquid crystals exhibiting ferroelectric property include: p-decyloxybenzylidene-p'-amino-2-methylbutylcinnamate; p-hexyloxybenzylidene-p'-amino-2-chloropropylcinnamate; and 4-o-(2-methyl)butylresorcylidene-4'-octylaniline. Examples of commercially available ferroelectric liquid crystals include: ZLI-5014-000 (trade name, capacitance of 2.88 nF, spontaneous Polarization of −2.8 C/cm$^2$, manufactured by Merck Ltd.); ZLI-5014-100 (trade name, capacitance of 3.19 nF, spontaneous polarization of −20.0 C/cm$^2$, manufactured by Merck Ltd.); and FELIX-008 (trade name, capacitance of 2.26 nF, spontaneous polarization of −9.6 C/cm$^2$, manufactured by Hoechst Aktiengesellschaft).

Any appropriate cell gap may be employed as the cell gap (distance between substrates) of the liquid crystal cell in accordance with the purpose. However, the cell gap is preferably 1.0 to 7.0 μm. A cell gap within the above range can reduce response time and provide good display properties.

C. Polarizer

Any appropriate polarizers may be employed as the polarizer used in the present invention in accordance with the purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based orientation film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred because of high polarized dichromaticity. A thickness of the polarizer is not particularly limited, but is generally about 5 to 80 μm. The polarizers arranged on both sides of the liquid crystal cell may be the same or different from each other.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washing away of an antiblocking agent, but also provides an effect of preventing unevenness such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

D. First Optical Element

Referring to FIGS. 1, 2A, and 2B, the first optical element 30 is arranged between the liquid crystal cell 10 and the polarizer 20. The first optical element 30 includes a retardation film containing a norbornene-based resin and satisfying the following expressions (1) and (2).

$$240 \text{ nm} \leq Re[590] \leq 350 \text{ nm} \quad (1)$$

$$0.20 \leq Rth[590]/Re[590] \leq 0.80 \quad (2)$$

D-1. Optical Properties of First Optical Element

In the specification of the present invention, Re[590] refers to an in-plane retardation value measured by using light of a wavelength of 590 nm at 23° C. In the specification of the present invention, the term "in-plane retardation value" refers to an in-plane retardation value of a retardation film when an optical element is formed of a single retardation film. Alternatively, the term "in-plane retardation value" refers to an in-plane retardation value of an entire laminate when an optical element is formed of a laminate including retardation films. Re[590] can be determined from an equation Re[590]=(nx−ny)×d (wherein, nx and ny respectively represent refractive indices of an optical element in a slow axis direction and a fast axis direction at a wavelength of 590 nm, and d (nm) represents a thickness of the optical element). Note that, the slow axis refers to a direction providing a maximum in-plane refractive index.

The first optical element has Re[590] of 240 to 350 nm, preferably 240 to 300 nm, more preferably 260 to 280 nm, and particularly preferably 265 to 275 nm. Re[590] is adjusted to about ½ of the measuring wavelength, to thereby enhance a contrast ratio of the liquid crystal display apparatus in an oblique direction.

In the specification of the present invention, Rth[590] refers to a thickness direction retardation value measured by light of a wavelength of 590 nm at 23° C. Rth[590] can be determined from an equation Rth[590]=(nx−nz)×d (wherein, nx and nz respectively represent refractive indices of the film in a slow axis direction and a thickness direction at a wavelength of 590 nm, and d (nm) represents a thickness of the film). Note that, the slow axis refers to a direction providing a maximum in-plane refractive index.

The first optical element has Rth[590] of preferably 35 to 190 nm, more preferably 90 to 190 nm, particularly preferably 100 to 165 nm, and most preferably 120 to 155 nm.

Re[590] and Rth[590] may be determined by using "KOBRA-21ADH" (trade name, manufactured by Oji Scientific Instruments). Refractive indices nx, ny, and nz can be determined by: using an in-plane retardation value (Re) of the optical element measured at a wavelength of 590 nm at 23° C., a retardation value (R40) measured by inclining a slow axis by 400 as a tilt angle, a thickness (d) of the optical element, and an average refractive index (n0) of the optical element; and using the following equations (i) to (vi) for computational numerical calculation. Then, Rth can be calculated from the following equation (iv). Here, φ and ny′ are represented by the following respective equations (v) and (vi).

$$Re = (nx - ny) \times d \quad (i)$$

$$R40 = (nx - ny') \times d / \cos(\phi) \quad (ii)$$

$$(nx + ny + nz)/3 = n0 \quad (iii)$$

$$Rth = (nx - nz) \times d \quad (iv)$$

$$\phi = \sin^{-1}[\sin(40)/n0] \quad (v)$$

$$ny' = ny \times nz / [ny^2 \times \sin^2(\phi) + nz2 \times \cos^2(\phi)]^{1/2} \quad (vi)$$

In the specification of the present invention, Rth[590]/Re[590] refers to a ratio (also referred to as Nz coefficient) of a thickness direction retardation value to an in-plane retardation value measured by using light of a wavelength of 590 nm at 23° C. When Rth[590]/Re[590] is smaller than 1, the first optical element has a refractive index profile of nx>nz>ny.

Rth[590]/Re[590] of the first optical element is preferably 0.2 to 0.8, more preferably 0.2 to 0.7, furthermore preferably 0.2 to 0.6, particularly preferably 0.4 to 0.6, and most preferably 0.45 to 0.55. Rth[590]/Re[590] of the retardation film of 0.5 can provide substantially constant retardation values regardless of an angle and can enhance a contrast ratio of the liquid crystal display apparatus in an oblique direction.

Wavelength dispersion property of the first optical element is preferably 0.81 to 1.10, and particularly preferably 0.95 to 1.05. Smaller wavelength dispersion property within the above ranges provides constant retardation values in a wide region of visible light. As a result, a contrast ratio of the liquid crystal display apparatus can be enhanced in an oblique direction, and an amount of color shift in an oblique direction can be reduced. Note that, the wavelength dispersion property of the optical element generally refers to wavelength dependence of retardation values. The wavelength dispersion property can be represented by a ratio of in-plane retardation values Re[480]/Re[590] measured by using light of wavelengths of 480 nm and 590 nm at 23° C. Note that, Re[480] and Re[590] respectively represent in-plane retardation values measured by using light of wavelengths of 480 nm and 590 nm at 23° C.

D-2. Means for Arranging First Optical Element

Any appropriate methods may be employed as a method of arranging the first optical element 30 between the liquid crystal cell 10 and the polarizer 20 in accordance with the purpose. The first optical element 30 is preferably attached to the polarizer 20 and the liquid crystal cell 10 by providing an adhesive layer or pressure sensitive adhesive layer (not shown) on both sides of the first optical element 30. In this way, contrast of a liquid crystal display apparatus employing the first optical element 30 can be enhanced.

A thickness of the adhesive or the pressure sensitive adhesive layer can be appropriately set in accordance with intended use, adhesive strength, and the like. However, the thickness thereof is generally 1 to 500 μm, preferably 5 to 200 μm, and particularly preferably 10 to 100 μm.

Any appropriate adhesives or pressure sensitive adhesives may be employed for forming the adhesive layer or the pressure sensitive adhesive layer. Examples thereof include those each containing as a base polymer a polymer such as an acrylic polymer, a silicone-based polymer, polyester, polyurethane, polyamide, polyvinyl ether, a vinyl acetate/vinyl chloride copolymer, modified polyolefin, an epoxy-based polymer, a fluorine-based polymer, or a rubber-based polymer (such as a natural rubber-based polymer or a synthetic rubber-based polymer), which can be appropriately selected and used. In particular, an acrylic pressure sensitive adhesive is preferably used from the viewpoint of excellent optical transparency, adhesive properties including moderate wettability, cohesiveness and adhesiveness, and excellent weatherability and thermal resistance.

The first optical element 30 is preferably arranged such that its slow axis is substantially parallel or perpendicular to an absorption axis of the adjoining polarizer 20. More preferably, the first optical element 30 is arranged such that its slow axis is substantially parallel to the absorption axis of the adjoining polarizer 20 to allow roll production of the film and facilitate attachment of the film. As a result, production efficiency may improve significantly. In the specification of the present invention, the phrase "substantiallyparallel" includes a case where the slow axis of the first optical element 30 and the absorption axis of the polarizer 20 form an angle of 0°±2.0°, preferably 0°±1.0°, and more preferably 0°±0.50. In the specification of the present invention, the phrase "substantially perpendicular" includes a case where the slow axis of the first optical element 30 and the absorption axis of the polarizer 20 form an angle of 90°±2.0°, preferably 90°±1.0°, and more preferably 90°±0.5°. An angle greatly departing from the above ranges may cause degradation in degree of polarization of the polarizing plates, and degradation of contrast when the first optical element is used in a liquid crystal display apparatus.

D-3. Structure of First Optical Element

A structure (laminate structure) of the first optical element is not particularly limited as long as the first optical element includes a retardation film containing a norbornene-based resin and the first optical element satisfies the optical properties as described in the above section D-1. To be specific, the first optical element may be: a single retardation film containing a norbornene-based resin; a laminate of two or more retardation films; or a laminate of the retardation film and another film (preferably isotropic film). The first optical element is preferably a single retardation film for reducing shift or unevenness in retardation values due to shrinkage stress of the polarizer or heat of backlight and for reducing a thickness of a liquid crystal panel. The first optical element as a laminate may include an adhesive layer, a pressure sensitive adhesive layer, or the like. In a case where the first optical element as a laminate includes two or more retardation films and/or two or more other films, the retardation films and/or the other films may be the same or different from each other. Details of the norbornene-based resin and other films will be described later.

Re[590] of the retardation film used for the first optical element can be appropriately selected in accordance with the number of retardation films to be used. For example, in a case where the first optical element is formed of a single retardation film, Re[590] of the retardation film is preferably equal to Re[590] of the first optical element. Thus, retardation of a pressure sensitive adhesive layer, an adhesive layer, or the like used for lamination of the first optical element on the polarizer or the liquid crystal cell is preferably as small as possible. Further, in a case where the first optical element is a laminate including two or more retardation films, for example, total Re[590] of the retardation films is preferably designed to be equal to Re[590] of the first optical element. To be specific, in a case where two retardation films are used, retardation films each having Re[590] of 100 to 175 nm are preferably used. Further, slow axes of the two retardation films are preferably laminated parallel to each other.

Rth[590]/Re[590] of the retardation film is preferably equal to Rth[590]/Re[590] of the first optical element regardless of the number of retardation films to be used. For example, an optical element having Rth[590]/Re[590] of 0.5 and Re[590] of 280 nm can be obtained by laminating two retardation films each having Rth[590]/Re[590] of 0.5 and Re[590] of 140 nm such that the respective slow axes are parallel to each other.

A total thickness of the first optical element is preferably 70 to 240 μm, more preferably 70 to 150 μm, and most preferably 70 to 120 μm. The first optical element has a thickness within the above ranges, to thereby provide a liquid crystal display apparatus having excellent optical uniformity.

Figure 3A:
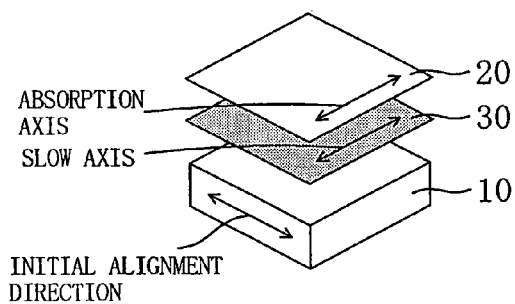
FIGS. 3A to 3H are each a schematic perspective view illustrating a typical preferred embodiment of a first optical element used in the present invention including its relationship with an absorption axis of a polarizer.
Figure 3E:
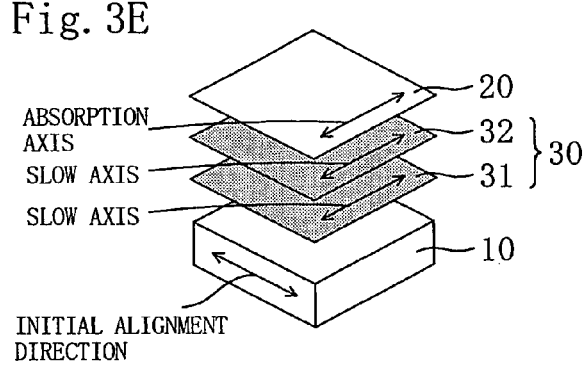
Figure 3B:
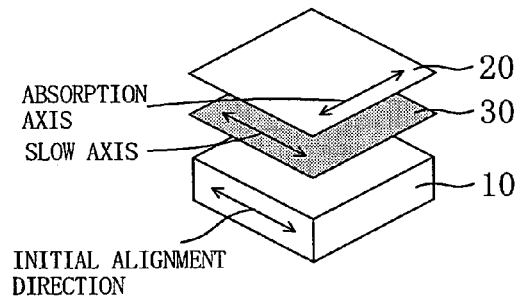
Figure 3F:
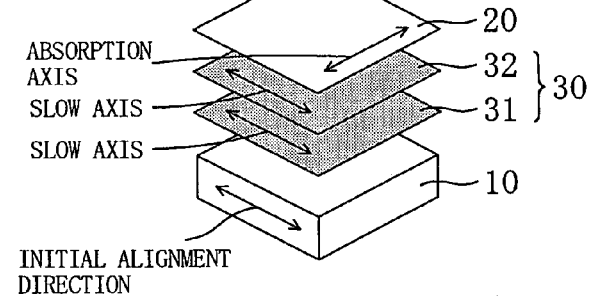
Figure 3C:
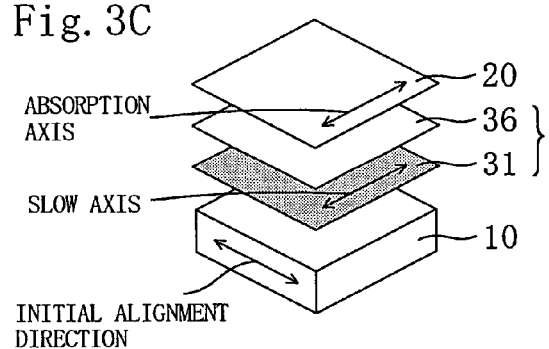
Figure 3G:
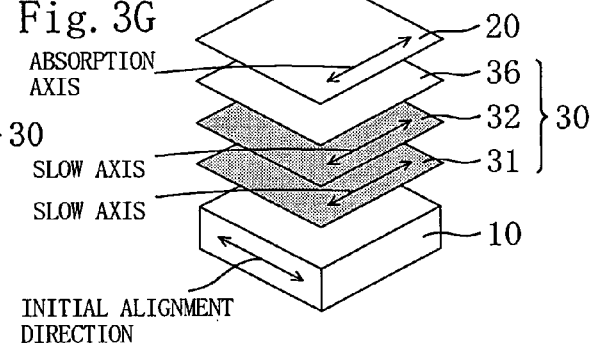
Figure 3D:
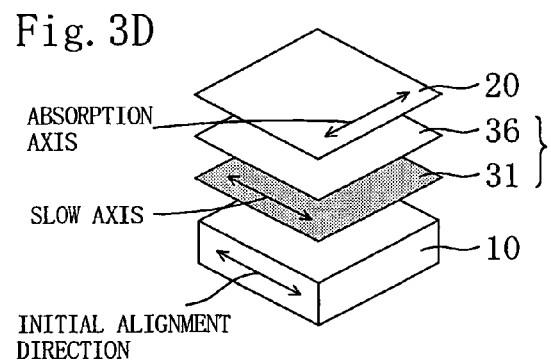
Figure 3H:
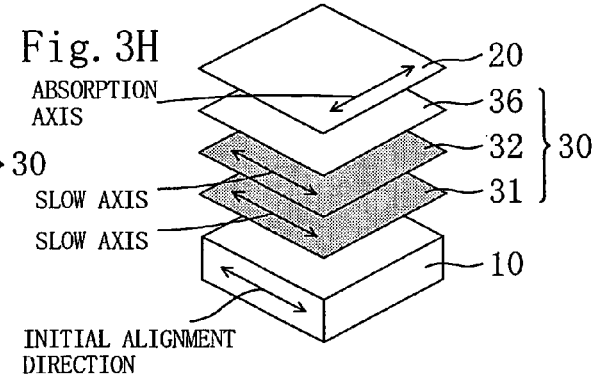

FIGS. 3A to 3H are each a schematic perspective view illustrating a typical preferred embodiment of the first optical element used in the present invention including its relationship with an absorption axis of a polarizer. FIGS. 3A and 3B each show a case where the first optical element 30 is a single retardation film. FIG. 3A shows a case where a slow axis of the retardation film (the first optical element) 30 is parallel to an absorption axis of the polarizer 20, and FIG. 3B shows a case where the slow axis of the retardation film (the first optical element) 30 is perpendicular to the absorption axis of the polarizer 20. In such embodiments, the retardation film also serves as a protective film for the polarizer on a side of the liquid crystal cell, to thereby contribute to reduction in thickness of the liquid crystal panel. Further, such embodiments are preferred from the viewpoints of small effects of shift or unevenness in retardation values due to shrinkage stress of the polarizer or heat of backlight. FIGS. 3C and 3D each show a case where the first optical element 30 is a laminate of one retardation film 31 and another film (preferably isotropic film) 36. FIG. 3C shows a case where a slow axis of the retardation film 31 is parallel to the absorption axis of the polarizer 20, and FIG. 3D shows a case where the slow axis of the retardation film 31 is perpendicular to the absorption axis of the polarizer 20. The other film 36 is preferably arranged on a side of the polarizer 20. In such embodiments, the other film serves as a protective film for the polarizer on a side of the liquid crystal cell. An isotropic film may be used as the other film, to thereby eliminate adverse effects ascribable to Rth of a conventional protective film for a polarizing plate. FIGS. 3E and 3F each show a case where the first optical element 30 is a laminate of two retardation films 31 and 32, and FIGS. 3G and 3H each show a case where the first optical element 30 is a laminate of two retardation films 31 and 32, and another film 36. As described above, the retardation films 31 and 32 each have Re[590] designed such that total Re[590] is equal to Re[590] of the first optical element, and each have Rth[590]/Re[590] designed to be equal to Rth[590]/Re[590] of the first optical element. Cases where the first optical element 30 includes at most two retardation films and at most one other film were described for simplicity. However, the present invention can be obviously applied to laminates each having three or more retardation films and/or two or more other films.

D-4. Retardation Film Containing Norbornene-Based Resin

As described above, the first optical element used in the present invention includes a retardation film containing a norbornene-based resin. The retardation film is a stretched polymer film containing a norbornene-based resin. The norbornene-based resin to be used preferably has a small photoelastic coefficient and easily causes retardation. A norbornene-based resin film has a smaller photoelastic coefficient than that of a conventional aromatic polymer film. Thus, even when the retardation film containing a norbornene-based resin is directly laminated on a polarizer through an adhesive or a pressure sensitive adhesive, the retardation film hardly causes shift or unevenness in retardation values due to shrinkage stress of the polarizer or heat of backlight when it is used for the liquid crystal display apparatus, to thereby provide good display properties. A significant result of the present invention is that a retardation film having a refractive index profile of nx>nz>ny and satisfying the formulae (1) and (2) was actually produced by using a norbornene-based resin.

An absolute value of photoelastic coefficient C[590] ($m^2$/N) of the retardation film is preferably $2.0\times10^{-13}$ to $2.0\times10^{-11}$, more preferably $5.0\times10^{-13}$ to $8.0\times10^{-12}$, particularly preferably $2.0\times10^{-12}$ to $6.0\times10^{-12}$, and most preferably $2.0\times10^{-12}$ to $5.0\times10^{-12}$. A significant result of the present invention is that a retardation film having a small photoelastic coefficient and a refractive index profile of nx>nz>ny was actually produced. Such retardation film is used as an optical element of a liquid crystal panel, to thereby maintain favorable display properties of the liquid crystal display apparatus for a long period of time.

A thickness of the retardation film may vary in accordance with the number of retardation films to be laminated and the presence or absence of other laminated films. The total thickness of the first optical element to be obtained may be set to preferably 70 to 240 µm, more preferably 70 to 150 µm. For example, in a case where the first optical element is formed of a single retardation film, a thickness of the retardation film is preferably 70 to 240 µm (that is, equal to the total thickness of the first optical element) Further, in a case where the first optical element is a laminate of two retardation films, for example, each retardation film may have any appropriate thickness as long as the total thickness of the retardation films is equal to a preferred total thickness of the first optical element. Thus, the thickness of the retardation films may be the same or different from each other. In an embodiment where two retardation films are laminated, one retardation film has a thickness of preferably 60 to 120 µm, and the other retardation film has a thickness of preferably 60 to 120 µm.

In the specification of the present invention, the norbornene-based resin refers to a (co)polymer obtained by using a norbornene-based monomer having a norbornene ring as a part or entire starting material (monomer). The norbornene-based resin is obtained by using as a starting material a norbornene-based monomer having a norbornene ring (having a double bond in a norbornane ring) However, the (co)polymer may or may not have a norbornane ring in a repeating unit. A norbornene-based resin as a (co)polymer having no norbornane ring is one obtained from a monomer forming a five-membered ring through ring opening, and typical examples of the monomer include norbornene, dicyclopentadiene, 5-phenylnorbornene, and derivatives thereof. In a case where the norbornene-based resin is a copolymer, an arrangement of its repeating units is not particularly limited. The norbornene-based resin may be a random copolymer, a block copolymer, or a graft copolymer.

Examples of the norbornene-based resin include: (A) a resin obtained through hydrogenation of a ring-opened (co)polymer of a norbornene-based monomer; and (B) a resin obtained through addition (co)polymerization of a norbornene-based monomer. The ring-opened (co)polymer of a norbornene-based monomer includes a resin obtained through hydrogenation of a ring-opened copolymer of one or more norbornene-based monomers, and α-olefins, cycloalkenes, and/or disconjugate dienes. The resin obtained through addition (co)polymerization of a norbornene-based monomer includes a resin obtained through addition (co)polymerization of one or more norbornene-based monomers, and α-olefins, cycloalkenes, and/or disconjugate dienes. The retardation film used for the firs optical element preferably includes a resin obtained through hydrogenation of a ring-opened (co)polymer of a norbornene-based monomer, to thereby obtain a highly uniform retardation film having excellent moldability and large retardation values.

More preferably, the retardation film used in the present invention includes a resin obtained through hydrogenation of a ring-opened (co) polymer of a norbornene-based monomer and containing at least repeating units represented by the following general formulae (I), (II), and/or (III).

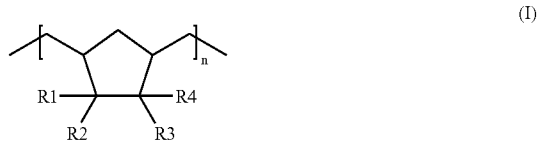

(I)

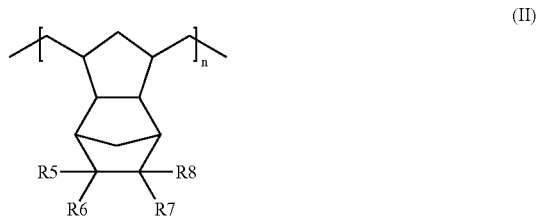

(II)

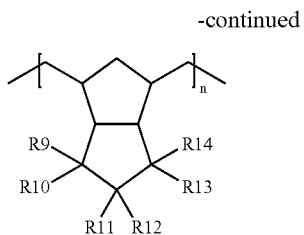

(III)

In the general formulae (I), (II), and (III), R1 to R14 each independently represent hydrogen, a halogen, a halogenated alkyl group, an alkyl group having 1 to 4 carbon atoms, an alkylidene group having 1 to 4 carbon atoms, an alkenyl group having 1 to 4 carbon atoms, an alkoxycarbonyl group having 1 to 4 carbon atoms, an aryl group, an aralkyl group, an aralkyloxy group, a hydroxyalkyl group, a cyano group, a cycloalkyl group having 4 to 10 carbon atoms, or an acyloxy group, or a substituted derivative thereof, and n represents an integer of 2 or more.

Particularly preferably, in the general formula (I), R1 to R4 each independently represent hydrogen, a halogen, a halogenated alkyl group, an alkyl group having 1 to 4 carbon atoms, an alkylidene group having 1 to 4 carbon atoms, an alkenyl group having 1 to 4 carbon atoms, an alkoxycarbonyl group having 1 to 4 carbon atoms, an aryl group, an aralkyl group, an aralkyloxy group, a cycloalkyl group having 4 to 10 carbon atoms, or an acyloxy group, and n represents an integer of 2 or more. In addition, in the general formula (II), R5 and R6 each independently represent hydrogen, a halogen, a halogenated alkyl group, an alkyl group having 1 to 4 carbon atoms, an alkylidene group having 1 to 4 carbon atoms, an alkenyl group having 1 to 4 carbon atoms, or an alkoxycarbonyl group having 1 to 4 carbon atoms, and n represents an integer of 2 or more. In addition, in the general formula (III), R9 to R14 each independently represent hydrogen or an alkyl group having 1 to 4 carbon atoms, and n represents an integer of 2 or more.

Most preferably, in the general formula (I), R1 and R2 each independently represent hydrogen, a trifluoromethyl group, a methyl group, an ethyl group, a methylidene group, an ethylidene group, a vinyl group, a propenyl group, a methoxycarbonyl group, an ethoxycarbonyl group, a phenyl group, an ethyl phenyl group, a benzoyloxy group, a cyclopentyl group, or a cyclohexyl group, R3 and R4 each represent hydrogen, and n represents an integer of 2 or more. In addition, in the general formula (II), R5 and R6 each independently represent hydrogen, a trifluoromethyl group, a methyl group, an ethyl group, a methylidene group, an ethylidene group, a vinyl group, a propenyl group, a methoxycarbonyl group, or an ethoxycarbonyl group, R7 and R8 each represent hydrogen, and n represents an integer of 2 or more. In addition, in the general formula (III), R9 to R12 each independently represent hydrogen or a methyl group, R13 and R14 each represent hydrogen, and n represents an integer of 2 or more.

Any appropriate monomers are selected as the norbornene-based monomer. For example, bicyclo[2.2.1]-hept-2-ene (common name: norbornene) and a derivative thereof can be used. Specific examples thereof include 5-methyl-bicyclo[2.2.1]-hept-2-ene, 5,5-dimethyl-bicyclo[2.2.1]-hept-2-ene, 5-ethyl-bicyclo[2.2.1]-hept-2-ene, 5-propyl-bicyclo[2.2.1]-hept-2-ene, 5-butyl-bicyclo[2.2.1]-hept-2-ene, 5-methylidene-bicyclo[2.2.1]-hept-2-ene, 5-ethylidene-bicyclo[2.2.1]-hept-2-ene, 5-vinyl-bicyclo[2.2.1]-hept-2-ene, 5-propenyl-bicyclo[2.2.1]-hept-2-ene, 5-methoxycarbonyl-bicyclo[2.2.1]-hept-2-ene, 5-ethoxycarbonyl-bicyclo[2.2.1]-hept-2-ene, 5-methyl-5-methoxycarbonyl-bicyclo[2.2.1]-hept-2-ene, 5-methyl-5-ethoxycarbonyl-bicyclo[2.2.1]-hept-2-ene, 5-phenyl-bicyclo[2.2.1]-hept-2-ene, 5-cyclopentyl-bicyclo[2.2.1]-hept-2-ene, 5-cyclohexyl-bicyclo[2.2.1]-hept-2-ene, 5-benzoyloxy-5-methylbicyclo[2.2.1]-hept-2-ene, 5-trifluoromethyl-bicyclo[2.2.1]-hept-2-ene, 5,6-bis(trifluoromethyl)-bicyclo[2.2.1]-hept-2-ene, 5-benzyl-bicyclo[2.2.1]-hept-2-ene, 5-tolyl-bicyclo[2.2.1]-hept-2-ene, 5-(ethylphenyl)-bicyclo[2.2.1]-hept-2-ene, 5-(isopropylphenyl)-bicyclo[2.2.1]-hept-2-ene, 5-cyano-bicyclo[2.2.1]-hept-2-ene, bicyclo[2.2.1]-hept-5-enyl-2-propionate, bicyclo[2.2.1]-hept-5-enyl-2-methyloctanoate, bicyclo[2.2.1]-hept-5-ene-5,6-dicarboxylic anhydride, and 5-hydroxymethyl-bicyclo[2.2.1]-hept-5-ene, and polar group (such as halogen)-substituted products thereof.

Tricyclo[$4.3.1^{2,5}.0^{1,6}$]-deca-3,7-diene (common name: dicyclopentadiene) and a derivative thereof can also be used. Specific examples thereof include tricyclo[$4.3.1^{2,5}.0^{1,6}$]-deca-3-ene, 2-methyl-tricyclo[$4.3.1^{2,5}.0^{1,6}$]-deca-3-ene, and 5-methyl-tricyclo[$4.3.1^{2,5}.0^{1,6}$]-deca-3-ene, and polar group (such as halogen)-substituted products thereof.

Tricyclo[$4.4.1^{2,5}.0^{1,6}$]-undeca-3,7-diene, tricyclo[$4.4.1^{2,5}.0^{1,6}$]-undeca-3,8-diene, and tricyclo[$4.4.1^{2,5}.0^{1,6}$]-undeca-3-ene, and derivatives (such as polar group (such as halogen)-substituted products) thereof can be used.

Tetracyclo[$4.4.1^{2,5}.1^{7,10}.0$]-dodeca-3-ene (common name: tetracyclododecene) and a derivative thereof can also be used. Specific examples thereof include 8-methyl-tetracyclo[$4.4.1^{2,5}.1^{7,10}.0$]-dodeca-3-ene, 8-ethyl-tetracyclo[$4.4.1^{2,5}.1^{7,10}.0$]-dodeca-3-ene, 8-methylidene-tetracyclo[$4.4.1^{2,5}.1^{7,10}.0$]-dodeca-3-ene, 8-ethylidene-tetracyclo[$4.4.1^{2,5}.1^{7,10}.0$]-dodeca-3-ene, 8-vinyl-tetracyclo[$4.4.1^{2,5}.1^{7,10}.0$]-dodeca-3-ene, 8-propenyl-tetracyclo[$4.4.1^{2,5}.1^{7,10}.0$]-dodeca-3-ene, 8-methoxycarbonyl-tetracyclo[$4.4.1^{2,5}.1^{7,10}.0$]-dodeca-3-ene, 8-ethoxycarbonyl-tetracyclo[$4.4.1^{2,5}.1^{7,10}.0$]-dodeca-3-ene, 8-n-propoxycarbonyl-tetracyclo[$4.4.1^{2,5}.1^{7,10}.0$]-dodeca-3-ene, 8-butoxycarbonyl-tetracyclo[$4.4.1^{2,5}.1^{7,10}.0$]-dodeca-3-ene, 8-phenoxycarbonyl-tetracyclo[$4.4.1^{2,5}.1^{7,10}.0$]-dodeca-3-ene, 8-trifluoromethyl-tetracyclo[$4.4.1^{2,5}.1^{7,10}.0$]-dodeca-3-ene, 8-methyl-8-trifluoromethyl-tetracyclo[$4.4.1^{2,5}.1^{7,10}.0$]-dodeca-3-ene, 8-methyl-8-methoxycarbonyl-tetracyclo[$4.4.1^{2,5}.1^{7,10}.0$]-dodeca-3-ene, 8-methyl-8-ethoxycarbonyl-tetracyclo[$4.4.1^{2,5}.1^{7,10}.0$]-dodeca-3-ene, 8-methyl-8-n-propoxycarbonyl-tetracyclo[$4.4.1^{2,5}.1^{7,10}.0$]-dodeca-3-ene, 8-methyl-8-butoxycarbonyl-tetracyclo[$4.4.1^{2,5}.1^{7,10}.0$]-dodeca-3-ene, and 8-methyl-8-phenoxycarbonyl-tetracyclo[$4.4.1^{2,5}.1^{7,10}.0$]-dodeca-3-ene, and polar group (such as halogen)-substituted products thereof. The norbornene-based monomers may be used alone or in combination. The norbornene-based monomer may be used after having been subjected to any appropriate modification.

The norbornene-based monomer is preferably 5-methyl-bicyclo[2.2.1]-hept-2-ene, 5-methyl-bicyclo[2.2.1]-hept-2-ene, 5-methoxycarbonyl-bicyclo[2.2.1]-hept-2-ene, 5-methyl-5-methoxycarbonyl-bicyclo[2.2.1]-hept-2-ene, 5-phenyl-bicyclo[2.2.1]-hept-2-ene, tricyclo[$4.3.1^{2,5}.0^{1,6}$]-deca-3,7-diene, tricyclo[$4.3.1^{2,5}.0^{1,6}$]-deca-3-ene, tetracyclo[$4.4.1^{2,5}.1^{7,10}.0$]-dodeca-3-ene, 8-methyl-tetracyclo[$4.4.1^{2,5}.1^{7,10}.0$]-dodeca-3-ene, 8-methoxycarbonyl-tetracyclo[$4.4.1^{2,5}.1^{7,10}.0$]-dodeca-3-ene, or 8-methyl-8-methoxycarbonyl-tetracyclo[$4.4.1^{2,5}.1^{7,10}.0$]-dodeca-3-ene, or a combination thereof.

The α-olefins has preferably 2 to 20 carbon atoms, or more preferably 2 to 10 carbon atoms. Specific examples of the α-olefins include ethylene, propylene, 1-butene, 3-methyl-1-butene, 1-pentene, 3-methyl-1-pentene, 4-methyl-1-pentene, 4,4-dimethyl-1-pentene, 1-hexene, 3-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, and 1-eicosene. Of those, ethylene is particularly preferred. Those α-olefins may be used alone or in combination. The α-olefins may be copolymerized with other vinyl-based monomers as required unless an effect of the present invention is impaired.

Examples of the cycloalkenes include cyclobutene, cyclopentene, cyclohexene, 3-methyl-cyclohexene, 3,4-dimethylcyclohexene, 2-(2-methylbutyl)-1-cyclohexene, cycloheptene, cyclooctene, 6-bromo-3-chloro-4-methylcyclohexene, 3a,5,6,7a-tetrahydro-4,7-methano-1H-indene, and 5,6-dihydrodicyclopentadiene. Those cycloalkenes may be used alone or in combination. Those cycloalkenes may be copolymerized with other vinyl-based monomers as required unless the effect of the present invention is impaired.

Examples of the disconjugate diene include 1,4-hexadiene, 4-methyl-1,4-hexadiene, 5-methyl-1,4-hexadiene, and 1,7-octadiene. Those disconjugate dienes may be used alone or in combination. Those disconjugate dienes may be copolymerized with other vinyl-based monomers as required unless the effect of the present invention is impaired.

The resin obtained through hydrogenation of the ring-opened (co)polymer of a norbornene-based monomer can be obtained by: subjecting the norbornene-based monomer or the like to a metathesis reaction to obtain a ring-opened (co)polymer; and subjecting the ring-opened (co)polymer to hydrogenation. The resin is produced through, for example: a method described in "Development and applied techniques of optical polymer materials", published by NTS Inc., p. 103 to p. 111 (2003); a method described in paragraphs [0059] and [0060] of JP 11-116780 A; a method described in paragraphs [0035] to [0037] of JP 2001-350017 A; and a method described in paragraph [0053] of JP 2005-008698 A.

Examples of a catalyst for ring opening polymerization used in metathesis reaction include: a halide of a metal such as ruthenium, rhodium, palladium, osmium, iridium, or platinum; a polymerization catalyst composed of a nitrate or acetylacetone compound, and a reducing agent; and a polymerization catalyst composed of a halide of a metal such as titanium, vanadium, zirconium, tungsten, or molybdenum, or acetylacetone compound, and an organic aluminum compound. Reaction conditions such as polymerization temperature and polymerization pressure may be appropriately selected in accordance with the type of norbornene-based monomer, intended molecular weight, and the like. In one embodiment of the present invention, a polymerization temperature is preferably −50° C. to 100° C., and a polymerization pressure is preferably 0 to 50 kgf/cm$^2$.

Each of the resins obtained by hydrogenating ring-opened (co)polymers of the norbornene-based monomers can be obtained through a hydrogenation reaction performed by blowing hydrogen in the presence of any appropriate hydrogenation catalysts. Specific examples of the hydrogenation catalyst include: a homogenous catalyst composed of a transition metal compound/an alkyl metal compound such as cobalt acetate/triethyl aluminum, nickel acetylacetonate/triisobutyl aluminum, titanocene dichloride/n-butyllithium, zirconocene dichloride/sec-butyllithium, or tetrabutoxy titanate/dimethyl magnesium; a heterogeneous metal catalyst such as nickel, palladium, or platinum; and a heterogeneous solid-carrying catalyst wherein a metal catalyst is carried on a carrier, such as nickel/silica, nickel/diatomaceous earth, nickel/alumina, palladium/carbon, palladium/silica, palladium/diatomaceous earth, or palladium/alumina.

The resin obtained through addition (co)polymerization of a norbornene-based monomer can be obtained through a method described in Example 1 of JP 61-292601 A.

The norbornene-based resin used in the present invention has a weight average molecular weight (Mw) of preferably 20,000 to 400,000, more preferably 30,000 to 300,000, particularly preferably 40,000 to 200,000, and most preferably 40,000 to 80,000, measured through a gel permeation chromatograph (GPC) method by using a toluene solvent. The norbornene-based resin having a weight average molecular weight within the above ranges has excellent mechanical strength, and favorable solubility, moldability, and operability in casting.

In a case where the norbornene-based resin is obtained through hydrogenation of the ring-opened (co)polymer of a norbornene-based monomer, a hydrogenation rate is preferably 90% or more, more preferably 95% or more, and most preferably 99% or more. The norbornene-based resin obtained at hydrogenation rate within the above ranges has excellent heat resistance and excellent light resistance. The hydrogenation rate can be obtained by: subjecting the norbornene-based resin to $^1$H-NMR (500 MHz) measurement; and determining the hydrogenation rate from an integrated intensity ratio of paraffin-based hydrogen atoms to olefin-based hydrogen atoms.

The retardation film used for the first optical element may include two or more types of norbornene-based resins. The retardation film may include another thermoplastic resin in addition to the norbornene-based resin. A content (weight ratio) of the other thermoplastic resin is preferably more than 0 and 50 or less, and more preferably more than 0 and 40 or less with respect to a total solid content of the retardation film as 100. The content of the other thermoplastic resin within the above ranges can provide a retardation film having a small photoelastic coefficient, favorable wavelength dispersion properties, and excellent durability, mechanical strength, and transparency.

Any appropriate one is selected as the thermoplastic resin depending on purposes. Specific examples thereof include: general-purpose plastics such as a polyolefin resin, a polyvinyl chloride-based resin, a cellulose-based resin, a styrene-based resin, an acrylonitrile/butadiene/styrene-based resin, an acrylonitrile/styrene-based resin, polymethyl methacrylate, polyvinyl acetate, and a polyvinylidene chloride-based resin; general-purpose engineering plastics such as a polyamide-based resin, a polyacetal-based resin, a polycarbonate-based resin, a modified polyphenylene ether-based resin, a polybutylene terephthalate-based resin, and a polyethylene terephthalate-based resin; and super engineering plastics such as a polyphenylene sulfide-based resin, a polysulfone-based resin, a polyether sulfone-based resin, a polyether ether ketone-based resin, a polyarylate-based resin, a liquid crystalline resin, a polyamide-imide-based resin, a polyimide-based resin, and a polytetrafluoroethylene-based resin. Those thermoplastic resins may be used alone or in combination. Those thermoplastic resins may be used after having been subjected to any appropriate polymer modification. Examples of the polymer modification include copolymerization, cross-linking, a molecular terminal modification, and stereoregularity modification.

In a case where the retardation film used for the first optical element is a stretched polymer film containing the norbornene-based resin and another thermoplastic resin, the other thermoplastic resin is preferably a styrene-based resin. The styrene-based resin is used for adjusting the wavelength dispersion properties or photoelastic coefficient of the retardation film. In the specification of the present invention, the term "styrene-based resin" refers to a polymer obtained by polymerizing a styrene-based monomer. Examples of the styrene-based monomer include styrene, α-methylstyrene, o-methylstyrene, p-methylstyrene, p-chlorostyrene, p-nitrostyrene, p-aminostyrene, p-carboxystyrene, p-phenylstyrene, and 2,5-dichlorostyrene.

The styrene-based resin may be a copolymer obtained through a reaction of the styrene-based monomer and another monomer. Specific examples of the copolymer include a styrene/maleimide copolymer, a styrene/maleic anhydride copolymer, and a styrene/methyl methacrylate copolymer. In a case where the styrene-based resin is a copolymer obtained through a reaction of the styrene-based monomer and another monomer, a content of the styrene-based monomer is preferably 50 mol % or more and less than 100 mol %, more preferably 60 mol % or more and less than 100 mol %, and most preferably 70 mol % or more and less than 100 mol %. The content of the styrene-based monomer within the above ranges can provide a retardation film having a small photoelastic coefficient and excellent wavelength dispersion properties.

The styrene-based resin has a weight average molecular weight (Mw) of preferably 1,000 to 400,000, and more preferably 2,000 to 300,000, measured through a gel permeation chromatograph (GPC) method by using a tetrahydrofuran solvent. The styrene-based resin having a weight average molecular weight within the above ranges has favorable solubility or moldability.

The retardation film used in the present invention can be obtained by: attaching a shrinkable film to one side or both sides of a polymer film containing a norbornene-based resin; and heat stretching the resultant through a vertical uniaxial stretching method by using a roll stretching machine. The shrinkable film is used for providing shrinkage force in a direction perpendicular to a stretching direction during heat stretching, and for increasing a refractive index nz of the retardation film in a thickness direction. A method of attaching the shrinkable film to one side or both sides of the polymer film is not particularly limited. However, a preferred method thereof involves bonding of the polymer film and the shrinkable film by providing an acrylic pressure sensitive adhesive layer containing as a base polymer an acrylic polymer therebetween because the method is excellent in productivity and workability.

Figure 4:
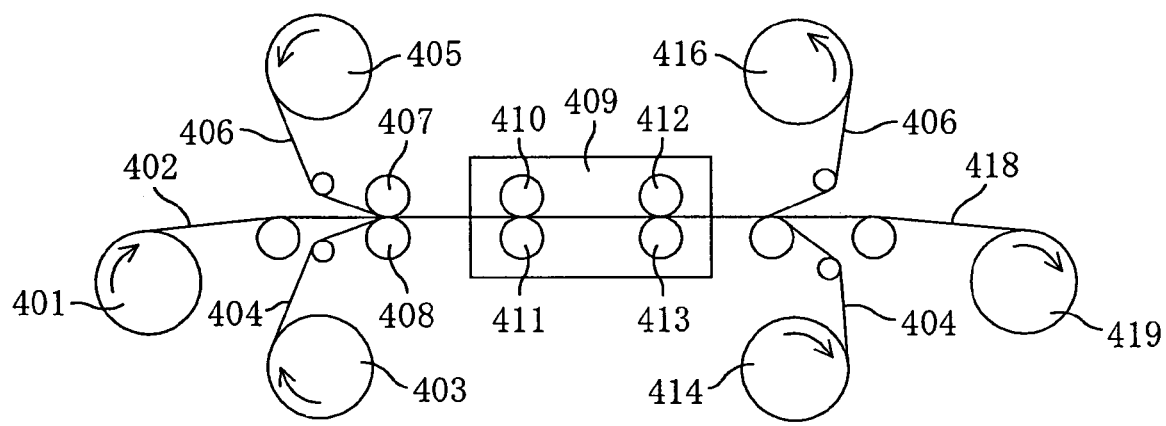
FIG. 4 is a schematic diagram showing a concept of a typical production process of a retardation film used in the present invention.

An example of a method of producing the retardation film used in the present invention will be described with reference to FIG. 4. FIG. 4 is a schematic diagram showing a concept of a typical production process of the retardation film used in the present invention. For example, a polymer film 402 containing a norbornene-based resin is delivered from a first delivery part 401. A shrinkable film 404 provided with a pressure sensitive adhesive layer and delivered from a second delivery part 403, and a shrinkable film 406 provided with a pressure sensitive adhesive layer and delivered from a third delivery part 405 are attached to both sides of the polymer film 402 by laminate rollers 407 and 408. A laminate having the shrinkable films attached to both sides of the polymer film is subjected to stretching treatment while the laminate is maintained at a constant temperature by heating means 409 under tension in a longitudinal direction of the film by rollers 410, 411, 412, and 413 at different speed ratios (under tension in a thickness direction by the shrinkable film at the same time). The shrinkable films 404 and 406 together with the pressure sensitive adhesive layers are peeled off from the laminate subjected to the stretching treatment at a first take-up part 414 and a second take-up part 416, to thereby obtain a retardation film (stretched film) 418. The obtained retardation film 418 is taken-up at a third take-up part 419.

The polymer film containing a norbornene-based resin can be obtained through a casting method from a generally used solution or through a melt extrusion method. A method of mixing resins is not particularly limited. For example, in a case where a film is produced through a casting method, a norbornene-based resin is stirred and mixed with a solvent at a predetermined ratio, to thereby prepare a homogeneous solution. Meanwhile, in a case where a film is produced through a melt extrusion method, a norbornene-based resin is melted to be extruded. The polymer film is preferably obtained through a casting method from the solution, to thereby provide a retardation film having good smoothness and good optical uniformity.

The shrinkable film is preferably a stretched film such as a biaxially stretched film or a uniaxially stretched film. The shrinkable film can be obtained by: forming an unstretched film through an extrusion method; and stretching the unstretched film in a machine and/or transverse direction at a predetermined stretch ratio by using a simultaneous biaxial stretching machine or the like. The forming and stretching conditions may be appropriately selected in accordance with the purpose, compositions or kinds of resins to be used, and the like. Examples of a material used for the shrinkable film include polyester, polystyrene, polyethylene, polypropylene, polyvinyl chloride, and polyvinylidene chloride. A biaxially stretched polypropylene film is preferably used from the viewpoints of excellent shrinkage uniformity and thermal resistance.

In one embodiment of the present invention, the shrinkable film has a shrinkage ratio in a longitudinal direction of the film $S^{140}(MD)$ of preferably 2.7 to 9.4%, and a shrinkage ratio in a width direction of the film $S^{140}(TD)$ of preferably 4.6 to 20% at 140° C. More preferably, $S^{140}(MD)$ is 6 to 8% and $S^{140}(TD)$ is 10 to 15.7%. In another embodiment of the present invention, the shrinkable film has a shrinkage ratio in a longitudinal direction of the film $S^{160}$ (MD) of preferably 17 to 21%, and a shrinkage ratio in a width direction of the film $S^{160}$ (TD) of preferably 40 to 52% at 160° C. Shrinkage ratios within the above ranges can provide intended retardation values and a retardation film having excellent uniformity.

In one embodiment of the present invention, a difference $\Delta S^{140}=S^{140}(TD)-S^{140}$ (MD) between the shrinkage ratio in a width direction of the film $S^{140}(TD)$ and the shrinkage ratio in a longitudinal direction of the film $S^{140}$ (MD) falls within a range of preferably $3.2\% \leq \Delta S^{140} \leq 10\%$, more preferably $6\% \leq \Delta S^{140} \leq 9.6\%$ at 140° C. In another embodiment of the present invention, a difference $\Delta S^{160}=S^{160}(TD)-S^{160}$ (MD) between the shrinkage ratio in a width direction of the film $S^{160}$ (TD) and the shrinkage ratio in a longitudinal direction of the film $S^{140}(MD)$ falls within a range of preferably $25\% \leq \Delta S^{160} \leq 35\%$ at 160° C. A large shrinkage ratio in an MD direction may cause difficulties in uniform stretching due to shrinkage force of the retardation film on a stretching machine, in addition to stretching tension. A difference within the above ranges allows uniform stretching without applying excess load to facilities such as a stretching machine.

The shrinkable film preferably has a shrinkage stress per 2 mm in a width direction $T_A^{140}(TD)$ of 0.5 to 0.9 N/2 mm at 140° C. The shrinkable film preferably has a shrinkage stress per unit area in a width direction $T_B^{140}(TD)$ of 8.3 to 15.0 N/mm² at 140° C. A shrinkage stress within the above ranges can provide intended retardation values and allows uniform stretching.

The shrinkable film preferably has a shrinkage stress per 2 mm in a width direction $T_A^{150}(TD)$ of 0.6 to 1.0 N/2 mm at 150° C. The shrinkable film preferably has a shrinkage stress per unit area in a width direction $T_B^{150}(TD)$ of 10 to 16.7N/mm² at 150° C. A shrinkage stress within the above ranges can provide intended retardation values and allows uniform stretching.

The shrinkage ratios S(MD) and S(TD) can be determined in accordance with a heat shrinkage ratio A method of JIS Z1712 (except that: a heating temperature is changed from 120° C. to 140° C. or 160° C. as described above; and a load of 3 g is added to a sample piece) To be specific, five samples having a width of 20 mm and a length of 150 mm are sampled from a longitudinal direction (machine direction MD) and a width direction (transverse direction TD), respectively. The sample pieces are each marked at a distance of about 100 mm at a center. The sample pieces each with a load of 3 g are hung vertically into an air-circulating thermostatic bath maintained at 140° C.±3° C. or 160° C.±3° C. The sample pieces are heated for 15 min, taken out of the thermostatic bath, and left standing under standard conditions (room temperature) for 30 min. Then, the distances between marks are measured by using a caliper in accordance with JIS B7507, to thereby obtain an average of five measured values. A shrinkage ratio can be calculated from an equations (%)=[(distance between marks (mm) before heating−distance between marks (mm) after heating)/distance between marks (mm) before heating]×100.

A commercially available shrinkable film used for applications such as general packaging, food packing, pallet wrapping, shrinkable labels, cap seals, and electrical insulation can be appropriately selected and used as the above-described shrinkable film as long as the purpose of the present invention can be satisfied. The commercially available shrinkable film may be used as it is, or may be used after the shrinkable film is subjected to fabrication such as stretching treatment or shrinking treatment. Specific examples of the commercially available shrinkable film include: "ALPHAN" (trade name, available from Oji paper Co., Ltd.); "FANCYTOP series" (trade name, available from Gunze Ltd.); "TORAYFAN series" (trade name, available from Toray Industries, Inc.); "SUN•TOX-OP series" (tradename, available from SUN•TOX Co., Ltd.); and "TOH-CELLO OP series" (trade name, available from TOH-CELLO Co., Ltd.).

A temperature in a stretching oven (also referred to as stretching temperature) during heat stretching of the polymer film containing a norbornene-based resin is preferably a glass transition temperature (Tg) of the polymer film or higher because retardation values of the retardation film to be obtained easily even out, and the film hardly crystallizes (becomes clouded). The stretching temperature is preferably (Tg of the polymer film+1° C.) to (Tg+30° C.)

A glass transition temperature (Tg) of the polymer film is not particularly limited. However, the glass transition temperature (Tg) is preferably 110 to 185° C., more preferably 120 to 170° C., and particularly preferably 125 to 150° C. Tg of 110° C. or higher allows easy production of a film having good thermal stability. Tg of 185° C. or lower allows easy control of in-plane retardation and thickness direction retardation values of the film by stretching. The glass transition temperature (Tg) can be determined through a DSC method in accordance with JIS K7121.

A stretch ratio during heat stretching of the polymer film is not particularly limited and may be appropriately set in accordance with a composition of the polymer film, a kind of a volatile component or the like, a residual amount of the volatile component or the like, designed retardation values, and the like. For example, the stretch ratio is preferably 1.05 to 2.00 times. A delivery speed of the laminate (including the polymer film and the shrinkable film) during stretching is not particularly limited. However, the delivery speed is preferably 0.5 m/min or more, and more preferably 1 m/min or more in consideration of the machine accuracy, stability, and the like of the stretching machine.

D-5. Other Film Used for First Optical Element

In the first optical element 30, the other film which may be laminated on the retardation film containing a norbornene-based resin preferably has a small absolute value of photoelastic coefficient.

An absolute value of photoelastic coefficient C[590](m²/N) of the film is preferably $2.0 \times 10^{-13}$ to $8.0 \times 10^{-11}$, more preferably $5.0 \times 10^{-13}$ to $2.0 \times 10^{-11}$, particularly preferably $2.0 \times 10^{-12}$ to $6.0 \times 10^{-12}$, and most preferably $2.0 \times 10^{-12}$ to $5.0 \times 10^{-12}$.

A material for forming the film preferably has excellent transparency, mechanical strength, thermal stability, water shielding property, and the like. Specific examples thereof include: polyester-based resins such as polyethylene terephthalate and polyethylene naphthalate; cellulose-based resins such as diacetyl cellulose and triacetyl cellulose; acrylic resins such as polymethyl methacrylate; styrene-based resins such as polystyrene, an acrylonitrile/styrene copolymer, a styrene resin, an acrylonitrile/styrene resin, an acrylonitrile/butadiene/styrene resin, an acrylonitrile/ethylene/styrene resin, a styrene/maleimide copolymer, and a styrene/maleic anhydride copolymer; and polycarbonate-based resins. Further examples thereof include: cycloolefin-based resins; norbornene-based resins; polyolefin-based resins such as polyethylene, polypropylene, and an ethylene/propylene copolymer; vinyl chloride-based resins; amide-based resins such as nylon and aromatic polyamide; imide-based resins such as aromatic polyimide and polyimideamide; sulfone-based resins; polyethersulfone-based resins; polyetheretherketone-based resins; polyphenylenesulfide-based resins; vinyl alcohol-based resins; vinylidene chloride-based resins; vinyl butyral-based resins; arylate-based resins; polyoxymethylene-based resins; and epoxy-based resins. Still further examples thereof include polymer films composed of blended products of the above-described resins.

The other film is preferably an isotropic film. In the specification of the present invention, the isotropic film refers to a film having small retardation values providing no effects on optical properties in practical use. Such isotropic film having a small birefringence or photoelastic coefficient may be laminated on the retardation film containing a norbornene-based resin. Thus, shrinkage stress of the polarizer or heat of backlight transmitted to the retardation film can be reduced, to thereby further reduce shift or unevenness in retardation values. The retardation film containing a norbornene-based resin originally hardly causes shift or unevenness in retardation values due to shrinkage stress of the polarizer or heat of backlight. Thus, the isotropic film may be used in combination with the retardation film, to thereby provide a liquid crystal panel having excellent display properties with very small shift or unevenness in retardation values.

Re[590] of the isotropic film is preferably more than 0 nm and 5 nm or less, more preferably more than 0 nm and 3 nm or less, particularly preferably more than 0 nm and 2 nm or less, and most preferably more than 0 nm and 1 nm or less.

Rth[590] of the isotropic film is preferably more than 0 nm and 10 nm or less, more preferably more than 0 n=and 6 nm or less, particularly preferably more than 0 nm and 4 nm or less, and most preferably more than 0 nm and 2 nm or less.

A thickness of the isotropic film may vary in accordance with the number of isotropic films and/or retardation films to be laminated. For practical use, the isotropic film has a thickness for maintaining appropriate mechanical strength without providing effects on optical properties of the first optical element to be obtained. For example, in an embodiment where two retardation films and one isotropic film are laminated, the isotropic film preferably has a thickness of 20 to 120 μm.

Specific examples of a material for the isotropic film satisfying the retardation values and the photoelastic coefficient include: a norbornene-based resin described in JP06-51117A prepared by subjecting a ring-opened (co)polymer of a norbornene-based monomer to polymer modification such as maleic acid addition or cyclopentadiene addition as required and hydrogenating the modified product; a norbornene-based resin prepared through addition polymerization of a norbornene-based monomer; and a norbornene-based resin prepared through addition copolymerization of a norbornene-based monomer and an olefin-based monomer (such as ethylene or α-olefin). Another example thereof includes a cycloolefin-based resin described in JP 2002-348324 A prepared through polymerization of at least one of a polycyclic cycloolefin monomer such as norbornene, a monocyclic cycloolefin monomer, and an acyclic 1-olefin monomer in a form of solution, suspension, or molten monomer, or in a gas phase under the presence of a metallocene catalyst.

Further examples thereof include: a polycarbonate-resin described in JP 2001-253960 A having 9,9-bis(4-hydroxyphenyl)fluorene on a side chain; and a cellulose-based resin described in JP07-112446 A. Another example thereof includes a polymer film described in JP 2001-343529 A, that is, a film obtained from a resin composition containing a thermoplastic resin (A) having a substituted and/or unsubstituted imide group on a side chain, and a thermoplastic resin (B) having substituted and/or unsubstituted phenyl and nitrile groups on a side chain. A specific example thereof is a polymer film obtained from a resin composition containing an alternating copolymer of isobutylene and N-methylmaleimide, and an acrylonitrile/styrene copolymer.

Further examples thereof include: a random copolymer of a monomer forming a polymer exhibiting positive birefringence and a monomer forming a polymer exhibiting negative birefringence, described in "Development and applied technology of optical polymer material" (p. 194 to p. 207, published by NTS Inc., 2003); and a polymer doped with anisotropic low molecular weight molecules or birefringent crystals. However, the isotropic film used in the present invention is not limited thereto.

E. Second Optical Element

Referring to FIGS. 1, 2A, and 2B, the second optical element 40 is arranged between the liquid crystal cell 10 and the polarizer 20'. The second optical element 40 has substantially optical isotropy. In the specification of the present invention, the phrase "has substantially optical isotropy" refers to an optical element which has small retardation values substantially providing no effects on optical properties of the entire liquid crystal panel and which allows optical compensation of birefringence of the liquid crystal cell. For example, the optical element having substantially optical isotropy includes an optical element satisfying the following expressions (3) and (4).

$$0 \text{ nm} \leq Re[590] \leq 10 \text{ nm} \tag{3}$$

$$-10 \text{ nm} \leq Rth[590] \leq 20 \text{ nm} \tag{4}$$

(In the expressions (3) and (4), Re[590] and Rth[590] respectively represent in-plane retardation and thickness direction retardation values of the film measured by using light of a wavelength of 590 nm at 23° C.)

The second optical element preferably has as small Re[590] as possible for enhancing a contrast ratio of the liquid crystal display apparatus in an oblique direction. For practical use, the second optical element has Re[590] of 0 to 10 nm as described by the expression (3), preferably 0 to 5 nm, particularly preferably 0 to 2 nm, and most preferably 0 to 1 nm.

The second optical element also preferably has as small Rth[590] as possible for enhancing a contrast ratio of the liquid crystal display apparatus in an oblique direction. For practical use, the second optical element has Rth[590] of −10 to 20 nm as described by the expression (4), preferably −5 to 5 nm, more preferably −3 to 3 nm, and most preferably −2 to 2 nm.

A method of arranging the second optical element 40 between the liquid crystal cell 10 and the polarizer 20' is not particularly limited. The second optical element 40 is preferably attached to the liquid crystal cell 10 and the polarizer 20' by providing an adhesive layer or pressure sensitive adhesive layer (not shown) on both sides of the second optical element 40 and by attaching one side of the second optical element to one side of the polarizer 20' and the other side of the second optical element to one side of the liquid crystal cell 10. In this way, contrast of a liquid crystal display apparatus employing the second optical element 40 can be enhanced.

A thickness of the adhesive or the pressure sensitive adhesive layer can be appropriately set in accordance with intended use, adhesive strength, and the like. However, the thickness thereof is generally 1 to 500 μm, preferably 5 to 200 μm, and particularly preferably 10 to 100 μm.

The adhesive or the pressure sensitive adhesive for forming the adhesive layer or the pressure sensitive adhesive layer is not particularly limited. Examples thereof include those each containing as a base polymer a polymer such as an acrylic polymer, a silicone-based polymer, polyester, polyurethane, polyamide, polyvinyl ether, a vinyl acetate/vinyl chloride copolymer, modified polyolefin, an epoxy-based polymer, a fluorine-based polymer, or a rubber-based polymer (such as a natural rubber-based polymer or a synthetic rubber-based polymer), which can be appropriately selected and used. In particular, an acrylic pressure sensitive adhesive is preferably used from the viewpoint of excellent optical transparency, adhesive properties including moderate wettability, cohesiveness and adhesiveness, and excellent weatherability and thermal resistance.

The second optical element 40 has substantially optical isotropy, but a slow axis may be detected in practical use. In this case, the second optical element 40 is preferably arranged such that its slow axis is substantially parallel or perpendicular to an absorption axis of the adjoining polarizer 20'. More preferably, the second optical element 40 is arranged such that its slow axis is substantially parallel to the absorption axis of the adjoining polarizer 20' to allow roll production of the film and facilitate attachment of the film. As a result, production efficiency may improve significantly. In the specification of the present invention, the phrase "substantiallyparallel" includes a case where the slow axis of the second optical element 40 and the absorption axis of the polarizer 20' form an angle of 0°±2.0°, preferably 0°±1.0°, and more preferably 0°±0.5°. In the specification of the present invention, the phrase "substantially perpendicular" includes a case where the slow axis of the second optical element 40 and the absorption axis of the polarizer 20' form an angle of 90°±2.0°, preferably 90°±1.0°, and more preferably 90°±0.5°. An angle greatly departing from the above ranges may cause degradation in degree of polarization of the polarizing plates, and degradation of contrast when the second optical element is used for a liquid crystal display apparatus.

The second optical element preferably has as small thickness as possible within a range providing self-standing property and mechanical strength of a film for reducing shift or unevenness in retardation values due to shrinkage stress of the polarizer or heat of backlight. The thickness of the second optical element is typically 20 to 500 μm, more preferably 30 to 300 μm, particularly preferably 40 to 100 μm, and most preferably 50 to 80 μm. The second optical element has a thickness within the above ranges, to thereby provide a liquid crystal panel having excellent display evenness.

The second optical element may be: a single optical film; or a laminate of two or more optical films. The second optical element as a laminate may include an adhesive layer, a pressure sensitive adhesive layer, or the like for lamination of the optical films. The optical film may be an isotropic film or a retardation film as long as the second optical element as a whole has substantially optical isotropy. For example, in a case where two retardation films are laminated, the retardation films are preferably arranged such that respective slow axes are perpendicular to each other, to thereby reduce in-plane retardation values.

The optical film is not particularly limited as long as the present invention can be satisfied, but the optical film preferably has excellent transparency, mechanical strength, thermal stability, water shielding property, and the like. Specific examples of a material for forming the optical film include: polyester-based resins such as polyethylene terephthalate and polyethylene naphthalate; cellulose-based resins such as diacetyl cellulose and triacetyl cellulose; acrylic resins such as polymethyl methacrylate; styrene-based resins such as polystyrene, an acrylonitrile/styrene copolymer, a styrene resin, an acrylonitrile/styrene resin, an acrylonitrile/butadiene/styrene resin, an acrylonitrile/ethylene/styrene resin, a styrene/maleimide copolymer, and a styrene/maleic anhydride copolymer; and polycarbonate-based resins. Further examples thereof include: cycloolefin-based resins; norbornene-based resins; polyolefin-based resins such as polyethylene, polypropylene, and an ethylene/propylene copolymer; vinyl chloride-based resins; amide-based resins such as nylon and aromatic polyamide; imide-based resins such as aromatic polyimide and polyimideamide; sulfone-based resins; polyethersulfone-based resins; polyetheretherketone-based resins; polyphenylenesulfide-based resins; vinyl alcohol-based resins; vinylidene chloride-based resins; vinyl butyral-based resins; arylate-based resins; polyoxymethylene-based resins; and epoxy-based resins. Still further examples thereof include polymer films composed of blended products of the above-described resins.

Examples of the optical film include those similar to isotropic films used for the first optical element. Of those, at least one polymer film of a cellulose-based resin, a norbornene-based resin, and a resin containing an alternating copolymer of isobutylene and N-methylmaleimide and an acrylonitrile/styrene copolymer is particularly preferably used from the viewpoints of excellent transparency, excellent mechanical strength, excellent thermal stability, excellent water shielding property, a small photoelastic coefficient, and excellent adhesiveness to a polarizer.

In a case where the second optical element is formed by laminating the retardation films, the second optical element is typically formed by laminating retardation films such that a negative uniaxial retardation film (also referred to as negative C plate) satisfying a refractive index profile of nx≈ny>nz and a positive uniaxial retardation film (also referred to as positive C plate) satisfying a refractive index profile of nz>nx≈ny are laminated to cancel in-plane retardation and thickness direction retardation values of each other (wherein, nx and ny represent main in-plane refractive indices and nz represents a thickness refractive index). In the specification of the present invention, the expression "nx≈ny" is not strictly limited to a case exhibiting a relationship of nx=ny, and a uniaxial retardation film includes a retardation film having Re[590] of 10 nm or less.

A method of laminating the negative C plate and the positive C plate is not particularly limited, but the negative C plate and the positive C plate are preferably attached by providing an adhesive layer or a pressure sensitive adhesive layer therebetween. Further, the negative C plate and the positive C plate are preferably arranged such that the respective in-plane slow axes are perpendicular to each other to cancel in-plane retardation values.

The second optical element preferably employs a laminate film prepared by laminating the negative C plate satisfying the following expressions (7) and (8), and the positive C plate satisfying the following expressions (9) and (10).

$$0 \text{ nm} < Re[590] \leq 10 \text{ nm} \quad (7)$$

$$20 \text{ nm} < Rth[590] \leq 400 \text{ nm} \quad (8)$$

$$0 \text{ nm} < Re[590] \leq 10 \text{ nm} \quad (9)$$

$$-400 \text{ nm} \leq Rth[590] < -20 \text{ nm} \quad (10)$$

(In the expressions (7), (8), (9), and (10), Re[590] and Rth[590] respectively represent in-plane retardation and thickness direction retardation values of the film measured by using light of a wavelength of 590 nm at 23° C.)

Re[590] of the negative C plate is preferably more than 0 nm and 10 nm or less, more preferably more than 0 nm and 3 nm or less, particularly preferably more than 0 nm and 2 nm or less, and most preferably more than 0 nm and 1 nm or less.

Rth[590] of the negative C plate is preferably more than 20 nm and 400 nm or less, more preferably more than 20 nm and 200 nm or less, and most preferably more than 20 nm and 100 nm or less.

The negative C plate has a thickness of preferably 20 to 500 μm, more preferably 30 to 300 μm, particularly preferably 40 to 100 μm, and most preferably 50 to 80 μm.

Examples of a material for forming the negative C plate include: any appropriate polymer films; a film prepared by curing a liquid crystal material exhibiting a cholesteric liquid crystal phase; a film prepared by curing a discotic liquid crystal compound; and an inorganic layered compound.

Specific examples of the polymer film forming the negative C plate include: cellulose-based resins such as diacetyl cellulose and triacetyl cellulose; acrylic resins such as polymethyl methacrylate; and polycarbonate-based resins. Further examples thereof include: cycloolefin-based resins; norbornene-based resins; polyolefin-based resins such as polyethylene, polypropylene, and an ethylene/propylene copolymer; vinyl chloride-based resins; amide-based resins such as nylon and aromatic polyamide; imide-based resins such as aromatic polyimide and polyimideamide; sulfone-based resins; polyethersulfone-based resins; polyetheretherketone-based resins; polyphenylenesulfide-based resins; vinyl alcohol-based resins; vinylidene chloride-based resins; vinyl butyral-based resins; arylate-based resins; polyoxymethylene-based resins; and epoxy-based resins. Still further examples thereof include polymer films composed of blended products of the above-described resins.

The polymer film used as the negative C plate may be obtained by film formation through a casting method, or may be obtained by stretching through any appropriate stretching methods. Specific examples of the stretching method include: a vertical uniaxial stretching method; a transverse uniaxial stretching method; a vertical and transverse simultaneous biaxial stretching method; and a vertical and transverse sequential biaxial stretching method. The stretching method may be performed by using any appropriate stretching machines such as a roll stretching machine, a tenter, or a biaxial stretching machine. The stretching may be performed in two or more steps. The polymer film may be stretched in a longitudinal direction (machine direction MD) or width direction (transverse direction TD) of the film.

Examples of the material for forming the negative C plate include: a polyimide film described in paragraph [0100] of JP 2003-287750 A; a film prepared by curing a liquid crystal material containing a nematic liquid crystal monomer and a polymerizable chiral agent and exhibiting a cholesteric liquid crystal phase, described in paragraph [0123] of JP 2003-287623 A; a discotic liquid crystal non-aligned layer described in paragraph [0068] of JP 07-281028 A; and a film prepared by applying a water swelling inorganic layered compound on a substrate and drying the resultant, described in paragraph [0034] of JP 09-80233 A.

Re[590] of the positive C plate is preferably more than 0 nm and 10 nm or less, more preferably more than 0 nm and 3 nm or less, particularly preferably more than 0 nm and 2 nm or less, and most preferably more than 0 nm and 1 nm or less.

Rth[590] of the positive C plate is preferably −400 nm or more and less than −20 nm, more preferably −200 nm or more and less than −20 nm, and most preferably −100 nm and more and less than −20 nm.

The positive C plate has a thickness of preferably 0.1 to 50 μm, more preferably 0.1 to 30 μm, particularly preferably 0.1 to 10 μm, and most preferably 0.1 to 5 μm.

An example of the material for forming the positive C plate is a film prepared by applying a liquid crystal composition containing a liquid crystal polymer having mesogenic side-chains, capable of forming homeotropic alignment, and represented by the below-indicated formula (11) on a substrate and drying the resultant, which film is described in Example 1 of JP 2002-174725 A. Another example thereof includes a film, which is described in Example 1 of JP 2003-149441 A, prepared by: applying a composition containing a mixture of the liquid crystal polymer represented by the below-indicated formula (11) and a commercially available polymerizable liquid crystal monomer, and a polymerization initiator, with a solvent on a substrate; forming a uniform vertical alignment (also referred to as homeotropic alignment) of a polymerizable liquid crystal monomer; and curing the resultant.

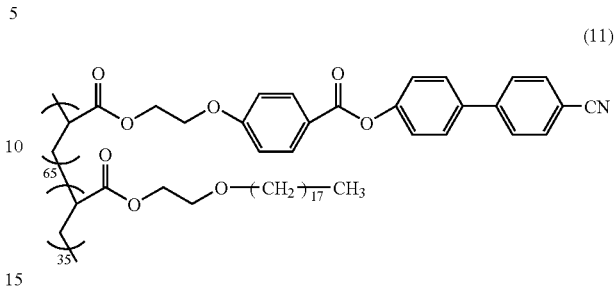

Figure 5A:
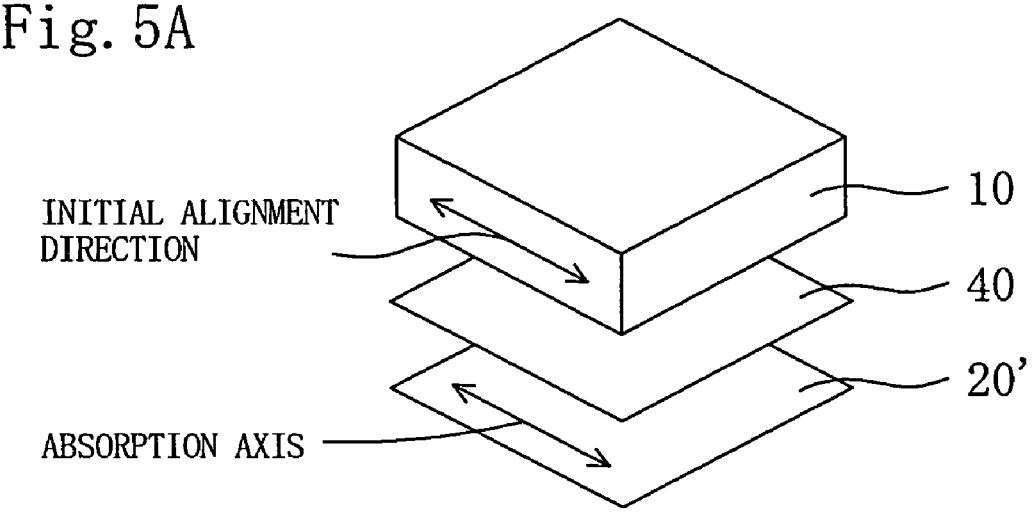
FIGS. 5A and 5B are each a schematic perspective view illustrating a typical preferred embodiment of a second optical element used in the present invention.
Figure 5B:
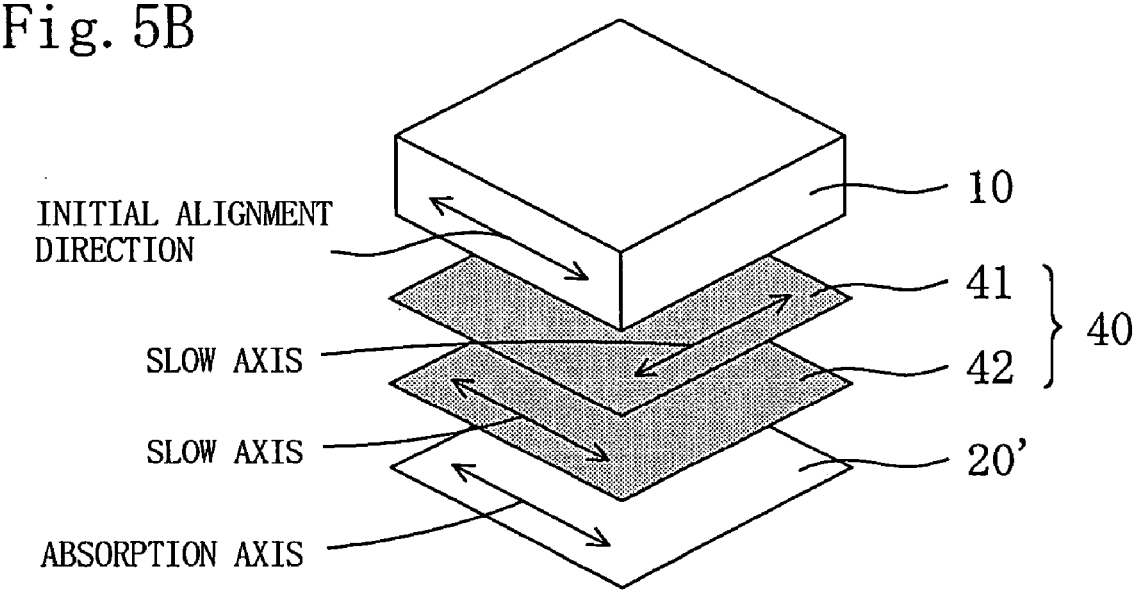

FIGS. 5A and 5B are each a schematic perspective view illustrating a typical preferred embodiment of the second optical element used in the present invention. FIG. 5A shows a case where the second optical element 40 is a single isotropic film. FIG. 5B shows a case where the second optical element 40 is a laminate of a negative C plate 41 and a positive C plate 42. The negative C plate 41 and the positive C plate 42 are arranged such that the respective slow axes are perpendicular to each other. The second optical element is not limited to have the structures of FIGS. 5A and 5B, and may have any appropriate structures having substantially optical isotropy.

F. Protective Film of Polarizer

A transparent film as a protective film for the polarizer may be arranged on the polarizer used for the liquid crystal panel of the present invention on a side where the first optical element or the second optical element is not attached (that is, outer sides of the polarizers 20 and 20' of FIGS. 1, 2A, and 2B).

The transparent film preferably has excellent transparency, mechanical strength, thermal stability, water shielding property, and the like. Examples of a material for forming the transparent film include: polyester-based resins such as polyethylene terephthalate and polyethylene naphthalate; cellulose-based resins such as diacetyl cellulose and triacetyl cellulose; acrylic resins such as polymethyl methacrylate; styrene-based resins such as polystyrene, an acrylonitrile/styrene copolymer, a styrene resin, an acrylonitrile/styrene resin, an acrylonitrile/butadiene/styrene resin, an acrylonitrile/ethylene/styrene resin, a styrene/maleimide copolymer, and a styrene/maleic anhydride copolymer; and polycarbonate-based resins. Further examples thereof include: cycloolefin-based resins; norbornene-based resin; polyolefin-based resins such as polyethylene, polypropylene, and an ethylene/propylene copolymer; vinyl chloride-based resins; amide-based resins such as nylon and aromatic polyamide; imide-based resins such as aromatic polyimide and polyimideamide; sulfone-based resins; polyethersulfone-based resins; polyetheretherketone-based resins; polyphenylenesulfide-based resins; vinyl alcohol-based resins; vinylidene chloride-based resins; vinyl butyral-based resins; arylate-based resins; polyoxymethylene-based resins; and epoxy-based resins. Still further examples thereof include polymer films composed of blended products of the above-described resins.

The surface of the transparent film without a polarizer attached thereto may be subjected to hard coat treatment, antireflection treatment, anti-sticking treatment, or diffusion treatment (also referred to as anti-glare treatment). The hard coat treatment is performed for prevention of damages on a surface of a polarizing plate, and a curable coated film with excellent hardness, slip property, and the like may be formed on the surface of the transparent protective film by using any appropriate UV-curable resins such as an acrylic resin or a silicone-based resin. The antireflection treatment is performed for antireflection of outside light at the surface of the polarizing plate. The anti-sticking treatment is performed for prevention of adherence of the polarizing plate with an adjoining layer. The anti-glare treatment is performed for prevention of reflection of outside light at the surface of the polarizing plate to disturb visual recognition of light transmitting through the polarizing plate, and the treatment may be performed, for example, by providing a fine uneven structure on the surface of the transparent protective film through any appropriate systems such as surface roughening system by sandblasting or embossing or a system of mixing transparent fine particles. An anti-glare layer formed through the anti-glare treatment may also serve as a diffusion layer (viewing angle expanding function, for example) for diffusing light transmitting through the polarizing plate and expanding a viewing angle or the like.

G. Other Optical Members

Next, description will be given of other optical members used in combination with the liquid crystal panel of the present invention. Any appropriate optical members that can be applied to the liquid Crystal panel may be employed as the other optical member. An example thereof includes an optical film subjected to the hard coat treatment, antireflection treatment, anti-sticking treatment, or diffusion treatment (also referred to as anti-glare treatment). Further, the liquid crystal panel of the present invention may be used in combination with a commercially available brightness enhancement film (polarization separation film having a polarization selection layer, D-BEF, manufactured by Sumitomo 3M Limited, for example), to thereby obtain a display apparatus having better display properties.

H. Liquid Crystal Display Apparatus

Figure 6:
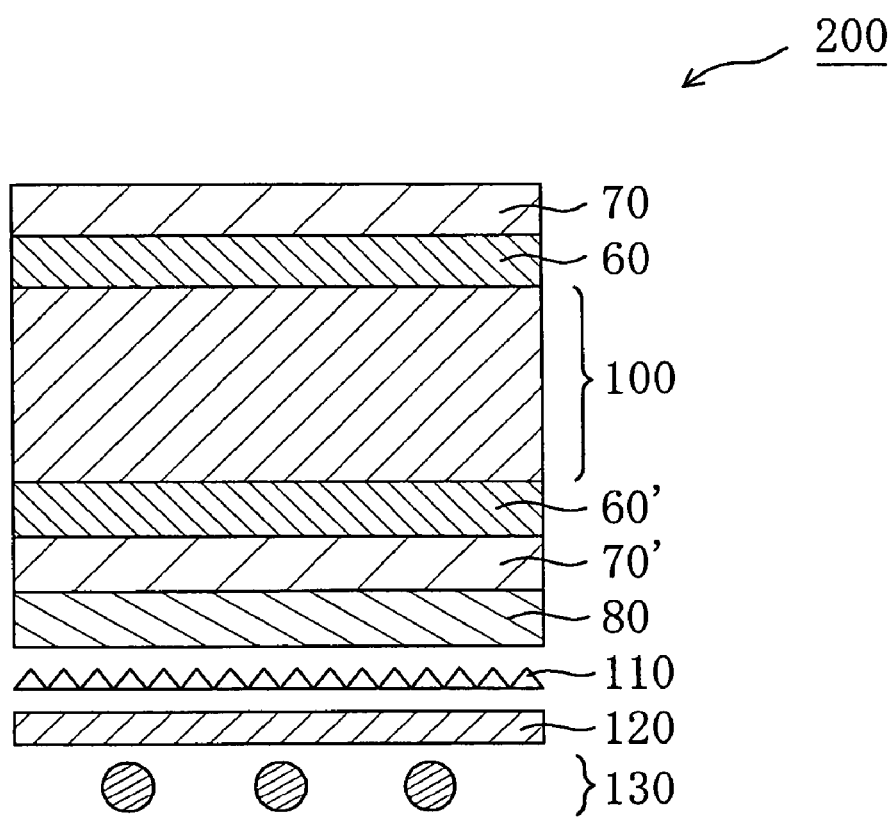
FIG. 6 is a schematic sectional view of a liquid crystal display apparatus according to a preferred embodiment of the present invention.

FIG. 6 is a schematic sectional view of a liquid crystal display apparatus according to a preferred embodiment of the present invention. Note that, ratios among length, width, and thickness of each member in FIG. 6 are different from those of an actual member for clarity. A liquid crystal display apparatus 200 is provided with: a liquid crystal panel 100; protective layers 60 and 60' arranged on both sides of the liquid crystal panel; surface treated layers 70 and 70' arranged on outer sides of the protective layers 60 and 60'; a brightness enhancement film 80 arranged on an outer side (backlight side) of the surface treated layer 70'; a prism sheet 110; a light guide plate 120; and backlight 130. Films subjected to the hard coat treatment, antireflection treatment, anti-sticking treatment, diffusion treatment (also referred to as anti-glare treatment), or the like is used as the surface treated layers 70 and 70'. A polarization separation film having a polarization selection layer "D-BEF series" (trade name, manufactured by Sumitomo 3M Limited, for example) or the like is used as the brightness enhancement film 80. The above-described optical members are used, to thereby obtain a display apparatus with better display properties. The optical members shown in FIG. 6 may be at least partly omitted or replaced by other members in accordance with the drive mode or application of the liquid crystal cell as long as the effects of the present invention are obtained.

In one embodiment of the present invention, a liquid crystal display apparatus including the liquid crystal panel of the present invention has a contrast ratio (YW/YB) of preferably 20 or more, more preferably 30 or more, particularly preferably 50 or more, and most preferably 80 or more at an azimuth angle of 45° and a polar angle of 60°. In one embodiment of the present invention, a maximum contrast ratio is preferably 400 or more, and more preferably 450 or more at an azimuth angle of 45° and a polar angle of 0° to 78°. In one embodiment of the present invention, a minimum contrast ratio is preferably 20 or more, and more preferably 50 or more at an azimuth angle of 45° and a polar angle of 0° to 78°. In one embodiment of the present invention, an average contrast ratio is preferably 200 or more, and more preferably 250 or more at an azimuth angle of 45° and a polar angle of 0° to 78°.

In one embodiment of the present invention, a liquid crystal display apparatus including the liquid crystal panel of the present invention has a contrast ratio in an oblique direction within the above ranges, and a color shift (Δab value) of preferably 1 or less, more preferably 0.7 or less, particularly preferably 0.6 or less, and most preferably 0.5 or less at an azimuth angle of 45° and a polar angle of 60°. In one embodiment of the present invention, a liquid crystal display apparatus including the liquid crystal panel of the present invention has a contrast ratio in an oblique direction within the above ranges, a maximum Δxy value of preferably 0.100 or less, and more preferably 0.090 or less in all azimuth directions (0° to 360°) at a polar angle of 60°, and an average Δxy value of preferably 0.060 or less in all azimuth directions (0° to 360°) at a polar angle of 60°.

In a case where a black image is displayed on a liquid crystal display apparatus including the liquid crystal panel of the present invention in a dark room at 23° C., a difference between maximum brightness and minimum brightness of the black image is preferably 1.79 or less, and more preferably 1.58 or less across an entire panel surface.

I. Application of Liquid Crystal Panel and Liquid Crystal Display Apparatus of the Present Invention The application of the liquid crystal panel and liquid crystal display apparatus of the present invention is not particularly limited, but the liquid crystal panel and liquid crystal display apparatus of the present invention may be used for various applications such as: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care and medical devices such as a nursing monitor and a medical monitor.

In particular, the liquid crystal panel and liquid crystal display apparatus of the present invention is preferably used for a large liquid crystal television. A liquid crystal television employing the liquid crystal panel and liquid crystal display apparatus of the present invention has a screen size of preferably wide 17-inch (373 mm×224 mm) or more, more preferably wide 23-inch (499 mm×300 mm) or more, particularly preferably wide 26-inch (566 mm×339 mm) or more, and most preferably wide 32-inch (687 mm×412 mm) or more.

The present invention will be described in more detail by using the following examples and comparative examples. The present invention is not limited to the examples. Analysis methods used in examples are described below.

(1) Identification of norbornene-based resin: $^1$H-NMR measurement was performed under the following conditions by using the following apparatus, and the norbornene-based resin was determined from an integration ratio of peaks of the obtained spectrum.
  Analyzer: "JNM-EX400", manufactured by JEOL Ltd.
  Transmitter nucleus: 1H
  Frequency: 400 MHz
  Pulse width: 45°
  Pulse repeating time: 10 seconds
  Measurement temperature: room temperature
(2) Method of measuring molecular weight: The molecular weight was calculated through a gel permeation chromatograph (GPC) method by using polystyrene as a standard sample. To be specific, the molecular weight was measured under the following measurement conditions by using the following apparatus and instruments.
  Measurement sample: A sample resin was dissolved in tetrahydrofuran to prepare a 0.1 wt % solution which was left standing over night. Then, the solution was filtered through a 0.45 μm membrane filter to obtain a filtrate for measurement.
  Analyzer: "HLC-8120GPC", manufactured by Tosoh Corporation
  Column: TSKgel SuperHM-H/H4000/H3000/H2000
  Column size: 6.0 mm I.D.×150 mm
  Eluant: tetrahydrofuran
  Flow rate: 0.6 ml/min
  Detector: RI
  Column temperature: 40° C.
  Injection amount: 20 μl
(3) Method of measuring glass transition temperature (Tg): The glass transition temperature was measured in accordance with JIS K7121 under the following measurement conditions by using the following apparatus.
  Analyzer: differential scanning calorimeter "DSC5500", manufactured by Seiko Instruments & Electronics Ltd.
  Measurement atmosphere: in a stream of nitrogen at 20 ml/min
  Temperature increase rate: 10° C./min
(4) Method of measuring retardation values, wavelength dispersion property, angles of slow axes, and light transmittance: The retardation values, wavelength dispersion property, angles of slow axes, and light transmittance were measured by using an automatic birefringence analyzer ("KOBRA-21ADH", trade name, manufactured by Oji Scientific Instruments) based on a parallel Nicol rotation method by using light of a wavelength of 590 nm at 23° C.
(5) Method of measuring photoelastic coefficient: The retardation values of the sample were measured under stress by using a spectroscopic ellipsometer "M-220" (trade name, manufactured by JASCO Corporation), and the photoelastic coefficient was calculated from a slope of a function of the stress and retardation values. To be specific, an in-plane retardation value of a sample piece of 2 cm×10 cm was measured under stress of 5N to 15 N by using light of a wavelength of 590 nm at 23° C.
(6) Method of measuring thickness: The thickness was measured by using a digital micrometer "K-351C-type", manufactured by Anritsu Corporation.
(7) Method of measuring shrinkage ratio of shrinkable film: The shrinkage ratios S (MD) and S (TD) were determined in accordance with a heat shrinkage ratio A method of JIS Z1712 (except that: a heating temperature was changed from 120° C. to 140° C. or 160° C.; and a load of 3 g was added to a sample piece). To be specific, five samples having a width of 20 mm and a length of 150 mm were sampled from a longitudinal direction (machine direction (MD)) and a width direction (transverse direction (TD)), respectively. The sample pieces were each marked at a distance of about 100 mm at a center. The sample pieces each with a load of 3 g were hung vertically into an air-circulating thermostatic bath maintained at 140° C.±3° C. or 160° C.±3° C. The sample pieces were heated for 15 min, taken out of the thermostatic bath, and left standing under standard conditions (room temperature) for 30 min. Then, the distances between marks were measured by using a caliper in accordance with JIS B7507, to thereby obtain an average of five measured values. A shrinkage ratio were calculated from an equation S(%)=[(distance between marks (mm) before heating−distance between marks (mm) after heating)/distance between marks (mm) before heating]×100.
(8) Method of measuring shrinkage stress in a width direction (TD) of shrinkable film: The shrinkage stress in a width direction (TD) was measured at 140° C. and 150° C. through a TMA method by using the following apparatus.
  Apparatus: "TMA/SS 6100", manufactured by Seiko Instruments Inc.
  Data processing: "EXSTAR6000", manufactured by Seiko Instruments Inc.
  Measurement mode: measurement with constant temperature increase (10° C./min)
  Measurement atmosphere: atmosphere air (room temperature)
  Load: 20 mN
  Sample size: 15 mm×2 mm (long side corresponds to width direction (TD))
  Film thickness: 60 μm
(9) Contrast ratio of liquid crystal display apparatus: The contrast ratio was calculated by using the following liquid crystal cell and measurement apparatus. A white image and a black image were displayed on a liquid crystal display apparatus, and Y values of an XYZ display system at an azimuth angle of 45° and a polar angle of 60° of a display screen were measured by using "EZ Contrast 160D" (trade name, manufactured by ELDIM SA). A contrast ratio "YW/YB" in an oblique direction was calculated from a Y value (YW) of the white image and a Y value (YB) of the black image. The azimuth angle of 45° refers to a direction rotated by 45° in a counter clockwise direction from a long side of the panel at 0°.
  Liquid crystal cell: liquid crystal cell installed in "KLV-17HR2", manufactured by Sony Corporation
  Panel size: 375 mm×230 mm
(10-1) Measurement of color shift (Δab value) in oblique direction of liquid crystal display apparatus: The color shift (Δab value) was calculated by using the following liquid crystal cell and measurement apparatus. To be specific, a black image was displayed on the liquid crystal display apparatus, and color tones (a values and b values) were measured at a polar angle of 600 in all azimuth directions (0° to 360°). Average values of the a values and the b values at a polar angle of 60° in all azimuth directions (0 to 360°) were respectively represented by an $a_{ave}$ value and a $b_{ave}$ value, and an a value and a b value at a polar angle of 60° and an azimuth angle of 45° were respectively represented by an $a_{45}°$ value and a $b_{45}°$ value. The color shift (Δab value) in an oblique direction was calculated from the following expression: $\{(a_{45}°-a_{ave.})^2+(b_{45}°-b_{ave.})^2\}^{1/2}$. Note that, the azimuth angle of 45° refers to a direction rotated by 45° in a counter clockwise direction from a longer side of the panel at 0°.

Measurement apparatus: "EZ Contrast 160D" (trade name, manufactured by ELDIM SA)

Liquid crystal cell: liquid crystal cell installed in "KLV-17HR2", manufactured by Sony Corporation Panel size: 375 mm×230 mm (10-2) Measurement of color shift (Δxy value) in oblique direction of liquid crystal display apparatus: The color shift (Δxy value) in an oblique direction was calculated by using the same liquid crystal cell and measurement apparatus as those used for the measurement of the Δab value. To be specific, a black image was displayed on the liquid crystal display apparatus, and color tones (x values and y values) were measured at a polar angle of 60° in all azimuth directions (0° to 360°). The color shift (Δxy value) in an oblique direction was calculated from the following expression:

$$\{(0.31-x)^2+(0.31-y)^2\}^{1/2}.$$

(11) Method of evaluating display unevenness of liquid crystal display apparatus: A display screen was photographed by using the following liquid crystal cell and measurement apparatus. In Table 4, "Good" refers to a liquid crystal cell providing a difference in brightness of 1.79 or less across an entire panel, and "No good" refers to a liquid crystal cell providing a difference in brightness of more than 1.79.

Liquid crystal cell: liquid crystal cell installed in "KLV-17HR2", manufactured by Sony Corporation Panel size: 375 mm×230 mm Measurement apparatus: two-dimensional color distribution measurement apparatus "CA-1500", manufactured by Konica Minolta Holdings, Inc.

Measurement environment: dark room (23° C.)

PREPARATION EXAMPLE 1

A biaxially stretched polypropylene film "TORAYFAN B02873" (trade name, thickness of 60 μm, available from Toray Industries, Inc.) having the properties shown in Table 1 was attached to both sides of a norbornene-based resin film "ZEONOR ZF14-100" (trade name, thickness of 100 μm, available from Zeon Corporation) through an acrylic pressure sensitive adhesive layer (thickness of 15 μm). Then, the resultant was stretched 1.38 times in an air-circulating thermostatic oven at 146° C. (temperature at a distance of 3 cm from a back surface of the film, temperature fluctuation of ±1° C.) by using a roll stretching machine while a longitudinal direction of the film was held, to thereby produce a retardation film A. Table 2 shows the properties of the obtained retardation film A. The norbornene-based film had a glass transition temperature (Tg) of 136° C., an in-plane retardation value before stretching of 5.0 nm, and a thickness retardation value before stretching of 12.0 nm.

TABLE 1

| Shrinkable film | | |
|---|---|---|
| Shrinkage ratio at 140° C. (longitudinal direction) | $S^{140}$ (MD) (%) | 6.4 |
| Shrinkage ratio at 140° C. (width direction) | $S^{140}$ (TD) (%) | 12.8 |
| Difference in shrinkage ratio at 140° C. (width direction-longitudinal direction) | $\Delta S^{140}$ (%) | 6.4 |

TABLE 1-continued

| Shrinkable film | | |
|---|---|---|
| Shrinkage ratio at 160° C. (longitudinal direction) | $S^{160}$ (MD) (%) | 19.6 |
| Shrinkage ratio at 160° C. (width direction) | $S^{160}$ (TD) (%) | 45.5 |
| Difference in shrinkage ratio at 160° C. (width direction-longitudinal direction) | $\Delta S^{160}$ (%) | 25.9 |
| Shrinkage stress at 140° C. in width direction | $T_A^{140}$ (N/2 mm) $T_B^{140}$ (N/mm²) | 0.65 10.8 |
| Shrinkage stress at 150° C. in width direction | $T_A^{150}$ (N/2 mm) $T_B^{150}$ (N/mm²) | 0.75 12.5 |

The acrylic pressure sensitive adhesive used in Preparation Example 1 was prepared by: using as a base polymer isononyl acrylate (weight average molecular weight of 550,000) synthesized through solution polymerization; and mixing 3 parts by weight of a crosslinking agent of a polyisocyanate compound "CORONATE L" (trade name, available from Nippon Polyurethane Industry Co., Ltd.) and 10 parts by weight of a catalyst "OL-1" (trade name, available from Tokyo Fine Chemical Co., Ltd.) with respect to 100 parts by weight of the base polymer.

PREPARATION EXAMPLE 2

A retardation film B was produced in the same manner as in Preparation Example 1 except that the stretching temperature was changed from 146° C. to 148° C. and the stretch ratio was changed from 1.38 times to 1.40 times. Table 2 shows the stretching conditions and the properties of the obtained retardation film B.

PREPARATION EXAMPLE 3

A retardation film C was produced in the same manner as in Preparation Example 1 except that the stretching temperature was changed from 146° C. to 148° C. and the stretch ratio was changed from 1.38 times to 1.35 times. Table 2 shows the stretching conditions and the properties of the obtained retardation film C.

PREPARATION EXAMPLE 4

A retardation film D was produced in the same manner as in Preparation Example 1 except that the stretching temperature was changed from 146° C. to 143° C. and the stretch ratio was changed from 1.38 times to 1.58 times. Table 2 shows the stretching conditions and the properties of the obtained retardation film D.

PREPARATION EXAMPLE 5

A retardation film E was produced in the same manner as in Preparation Example 1 except that the stretching temperature was changed from 146° C. to 143° C. and the stretch ratio was changed from 1.38 times to 1.52 times. Table 2 shows the stretching conditions and the properties of the obtained retardation film E.

PREPARATION EXAMPLE 6

A polycarbonate-based resin was obtained through a conventional method by using phosgene as a carbonate precursor and bisphenol A as an aromatic dihydric phenol component. Next, a biaxially stretched polypropylene film was attached to both sides of a polymer film (thickness of 60 μm) composed of the polycarbonate-based resin through an acrylic pressure sensitive adhesive layer. Then, the film was stretched 1.10 times in an air-circulating thermostatic oven at 160° C. (temperature at a distance of 3 cm from a back surface of the film, temperature fluctuation of ±1° C.) by using a roll stretching machine while a longitudinal direction of the film was held, to thereby obtain a retardation film F. Table 2 shows the properties of the obtained retardation film F. The biaxially stretched propylene film used in Preparation Example 6 had a shrinkage ratio in MD direction of 5.7% and a shrinkage ratio in TD direction of 7.6% at 140° C. The acrylic pressure sensitive adhesive was the same as those used in Preparation Example 1. Note that, the polymer film composed of the polycarbonate-based resin had a glass transition temperature (Tg) of 150° C., an in-plane retardation value before stretching of 7 nm, and a thickness retardation value before stretching of 15 nm.

PREPARATION EXAMPLE 9

20 parts by weight of a norbornene-based resin "ARTON" (available from JSR Corporation) was added to 80 parts by weight of cyclopentanone, to thereby prepare a solution. The solution was applied onto a triacetyl cellulose film "UZ-TAC" (trade name, Re[590] of 2.2 nm, Rth[590] of 39.8 nm, available from Fuji Photo Film Co., Ltd.) to a thickness of 150 μm, and the resultant was dried at 140° C. for 3 min. After drying, the norbornene-based film formed on the surface of the TAC film was peeled off, to thereby obtain a polymer film I. Table 3 shows the properties of the polymer film I.

PREPARATION EXAMPLE 10

An ethyl silicate solution (2 wt % mixed solution of ethyl acetate and isopropyl alcohol, available from COLCOAT Co., Ltd.) was applied onto a polyethylene terephthalate film

TABLE 2

| | Retardation film | Stretching temperature (° C.) | Stretch ratio (%) | Thickness after stretching (μm) | T [590] (%) | Rth [590]/ Re [590] | Re [590] (nm) | Rth [590] (nm) | C [590] (m$^2$/N) |
|---|---|---|---|---|---|---|---|---|---|
| Preparation Example 1 | A | 146 | 1.38 | 108 | 92 | 0.50 | 270 | 135 | $3.10 \times 10^{-12}$ |
| Preparation Example 2 | B | 148 | 1.40 | 111 | 92 | 0.44 | 245 | 107 | $3.10 \times 10^{-12}$ |
| Preparation Example 3 | C | 148 | 1.35 | 114 | 92 | 0.39 | 219 | 86 | $3.10 \times 10^{-12}$ |
| Preparation Example 4 | D | 143 | 1.58 | 46 | 92 | 0.50 | 145 | 73 | $3.10 \times 10^{-12}$ |
| Preparation Example 5 | E | 143 | 1.52 | 47 | 92 | 0.47 | 132 | 62 | $3.10 \times 10^{-12}$ |
| Preparation Example 6 | F | 160 | 1.10 | 65 | 92 | 0.48 | 284 | 135 | $1.00 \times 10^{-10}$ |

PREPARATION EXAMPLE 7

65 parts by weight of an alternating copolymer (N-methylmaleimide content of 50 mol %, glass transition temperature of 157° C.) composed of isobutylene and N-methylmaleimide, 35 parts by weight of an acrylonitrile/styrene copolymer (acrylonitrile content of 27 mol %), and 1 part by weight of 2-(4,6-diphenyl-1,3,5-triazin-2-yl)-5-[(hexyl)oxy]-phenol (ultraviolet absorber) were formed into pellets by using an extruder. Then, the pellets were dried at 100° C. for 5 hours, and were extruded at 270° C. by using a 40 nmφ single-screw extruder and a T-die having a width of 400 nm. The sheet-like molten resin was cooled on a cooling drum, to thereby produce a polymer film G having a width of about 600 mm and a thickness of about 40 μm. Table 3 shows the properties of the polymer film G.

PREPARATION EXAMPLE 8

A commercially available norbornene-based resin film "ZEONOR ZF14-040" (trade name, thickness of 40 μm, available from Zeon Corporation) was used as a polymer film H. Table 3 shows the properties of the polymer film H.

"S-27E" (thickness of 75 μm, available from Toray Industries, Inc.) by using a gravure coater. The resultant was dried at 130° C. for 30 sec, to thereby form a glass polymer film having a thickness of 0.1 μm.

5 parts by weight of a liquid crystal polymer (weight average molecular weight (Mw) of 5,000) having mesogenic side-chains, capable of forming homeotropic alignment, and represented by the below-indicated formula (11), 20 parts by weight of a commercially available polymerizable liquid crystal monomer "Paliocolor LC242" (trade name, available from BASF Aktiengesellschaft), and 1.25 parts by weight of a photopolymerization initiator "IRGACURE 907" (trade name, Ciba Specialty Chemicals) were dissolved in 75 parts by weight of cyclohexanone, to thereby prepare a mixed solution. The mixed solution was applied onto the glass polymer film on a polyethylene terephthalate film as the substrate by using a bar coater. The resultant was dried in an air-circulating thermostatic oven at 80° C.±1° C. for 2 min, and then cooled to room temperature, to thereby form a liquid crystal layer having vertically aligned polymerizable liquid crystal monomers fixed on a substrate. Next, the liquid crystal layer was irradiated with ultraviolet light (using irradiation equipment having a metal halide lamp as a light source) at 400 mJ/cm$^2$ (value measured at a wavelength of 365 nm) from a side having the mixed solution applied. The polymerizable liquid crystal monomer was cured, to thereby produce a positive C plate on the substrate. The obtained positive C-plate had a thickness of 0.55 μm, Re[590] of 0.1 nm, and Rth[590] of −55.2 nm.

The positive C plate was peeled off from the substrate, and laminated on a commercially available triacetyl cellulose film "UZ-TAC" (tradename, Re[590]of 2.5 nm, Rth[590]of 60.2 nm, available from Fuji Photo Film Co., Ltd.) having a thickness of 80 μm such that respective slow axes are perpendicular to each other, to thereby produce a polymer film J. Table 3 shows the properties of the polymer film J.

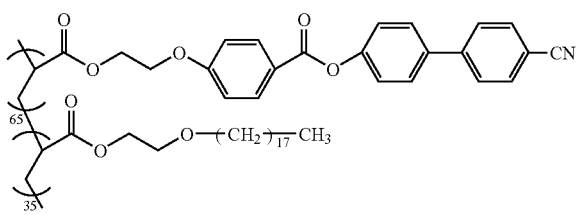

(11)

PREPARATION EXAMPLE 11

A commercially available norbornene-based resin film "ZEONOR ZF14-100" (trade name, thickness of 100 μm, available from Zeon Corporation) was used as a polymer film K. Table 3 shows the properties of the polymer film K.

PREPARATION EXAMPLE 12

A commercially available triacetyl cellulose film "UZ-TAC" (trade name, thickness of 40 μm, available from Fuji Photo Film Co., Ltd.) was used as a polymer film L. Table 3 shows the properties of the polymer film L.

PREPARATION EXAMPLE 13

A commercially available triacetyl cellulose film "UZ-TAC" (trade name, thickness of 80 μm, available from Fuji Photo Film Co., Ltd.) was used as a polymer film M. Table 3 shows the properties of the polymer film M.

TABLE 3

| Polymer film | Thickness (μm) | T [590] (%) | Re [590] (nm) | Rth [590] (nm) | C [590] (m²/N) |
|---|---|---|---|---|---|
| Preparation Example 7 | G | 40 | 93 | 0.1 | 1.0 | $4.59 \times 10^{-11}$ |
| Preparation Example 8 | H | 40 | 93 | 1.0 | 2.0 | $3.10 \times 10^{-12}$ |
| Preparation Example 9 | I | 42 | 91 | 0.2 | 3.0 | $5.00 \times 10^{-11}$ |
| Preparation Example 10 | J | 80.55 | 93 | 2.4 | 5.0 | $1.60 \times 10^{-11}$ |
| Preparation Example 11 | K | 100 | 92 | 5.0 | 10.0 | $3.10 \times 10^{-12}$ |
| Preparation Example 12 | L | 40 | 91 | 2.2 | 39.8 | $1.78 \times 10^{-11}$ |
| Preparation Example 13 | M | 80 | 91 | 2.5 | 60.2 | $1.75 \times 10^{-11}$ |

EXAMPLE 1

A polyvinyl alcohol film was colored in an aqueous solution containing iodine and then uniaxially stretched 6 times between rollers of different speed ratios in an aqueous solution containing boric acid, to thereby obtain two polarizers P1 and P2. The obtained polarizers P1 and P2 each had a water content of 23%, a thickness of 28 μm, a degree of polarization of 99.9%, and a single axis transmittance of 43.5%. Next, a liquid crystal panel was taken out from a liquid crystal display apparatus "KLV-17HR2" (manufactured by Sony Corporation) including a liquid crystal cell of IPS mode. Polarizing plates arranged above and below the liquid crystal cell were removed, and glass surfaces (front and back surfaces) were washed.

Next, the retardation film A as a first optical element was laminated on a surface of the liquid crystal cell on a viewer side such that a long side of the liquid crystal cell and a slow axis of the retardation film A were parallel to each other. Then, the polarizer P1 was laminated on the surface of the retardation film A such that the slow axis of the retardation film A and an absorption axis of the polarizer P1 were parallel (0°±0.5°) to each other. Then, a commercially available triacetyl cellulose film (trade name "UZ-TAC", thickness of 40 μm, available from Fuji Photo Film Co., Ltd.) was laminated on a surface of the polarizer P1 without the retardation film A laminated thereon.

Next, the polymer film G as a second optical element was laminated on the surface of the liquid crystal cell on a backlight side such that a short side of the liquid crystal cell and a slow axis of the polymer film G were parallel to each other. Then, the polarizer P2 was laminated on the surface of the polymer film G such that the slow axis of the polymer film G and an absorption axis of the polarizer P2 were parallel (0°±0.50) to each other. Then, a commercially available triacetyl cellulose film (trade name "UZ-TAC", thickness of 40 μm, available from Fuji Photo Film Co., Ltd.) was laminated on a surface of the polarizer P2 without the polymer film G laminated thereon, to thereby produce a liquid crystal panel I of O-mode having the same structure as that shown in FIG. 2A. The thus-produced liquid crystal panel had the absorption axes of the polarizers P1 and P2 perpendicular (90°±1.00) to each other.

Figure 7:
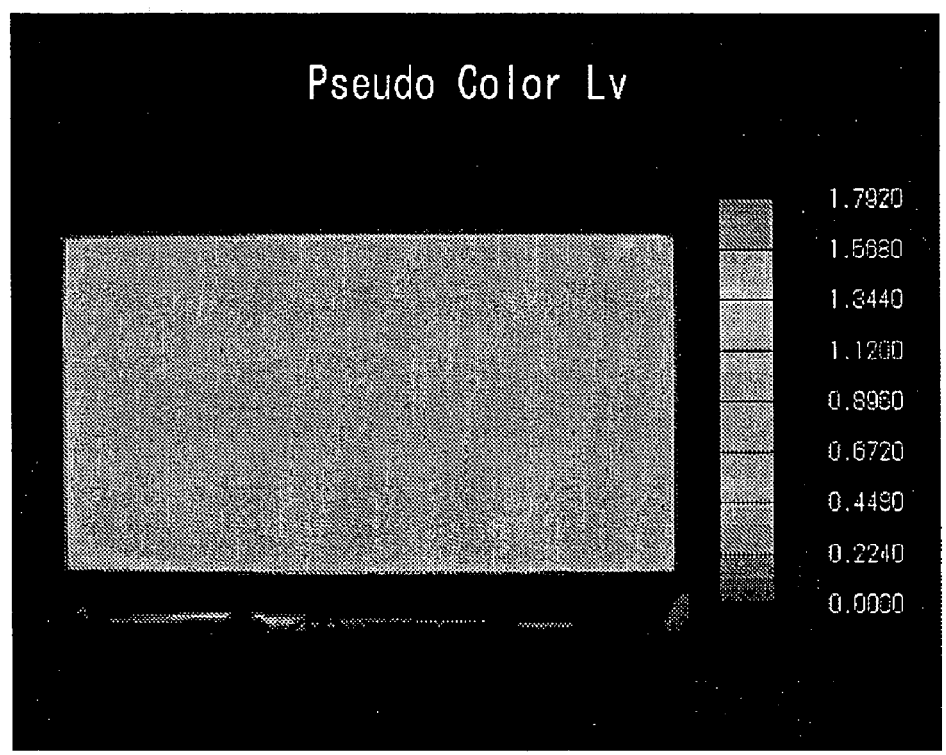
FIG. 7 is a photograph showing results of measurement of display unevenness of a liquid crystal cell according to Example 1 of the present invention.

The liquid crystal panel I was incorporated into the original liquid crystal display apparatus, and backlight was turned on for 10 min, to thereby measure a contrast ratio in an oblique direction. Table 4 shows the obtained properties. Then, backlight was turned on for additional 8 hours, and a display screen of the liquid crystal display apparatus was photographed in a dark room by using a two-dimensional color distribution measurement apparatus "CA-1500" (manufactured by Konica Minolta Holdings, Inc.). As shown in FIG. 7, there was little display unevenness due to heat of backlight.

EXAMPLE 2

A liquid crystal panel was produced in the same manner as in Example 1 except that the first optical element was changed from the retardation film A to the retardation film B. Then, a contrast ratio and color shift in an oblique direction of a liquid crystal apparatus incorporating the liquid crystal panel were measured. Table 4 shows the obtained properties.

EXAMPLE 3

A liquid crystal panel was produced in the same manner as in Example 1 except that the first optical element was changed from the retardation film A to a laminate of two retardation films D. Then, a contrast ratio and color shift in an oblique direction of a liquid crystal apparatus incorporating the liquid crystal panel were measured. Table 4 shows the obtained properties. The two retardation films D were laminated such that the respective slow axes were parallel to each other.

EXAMPLE 4

A liquid crystal panel was produced in the same manner as in Example 1 except that the first optical element was changed from the retardation film A to a laminate of two retardation films E. Then, a contrast ratio and color shift in an oblique direction of a liquid crystal apparatus incorporating the liquid crystal panel were measured. Table 4 shows the obtained properties. The two retardation films E were laminated such that the respective slow axes were parallel to each other.

EXAMPLE 5

A liquid crystal panel was produced in the same manner as in Example 1 except that the second optical element was changed from the polymer film G to the polymer film H. Then, a contrast ratio and color shift in an oblique direction of a liquid crystal apparatus incorporating the liquid crystal panel were measured. Table 4 shows the obtained properties.

EXAMPLE 6

A liquid crystal panel was produced in the same manner as in Example 1 except that the second optical element was changed from the polymer film G to the polymer film J. Then, a contrast ratio and color shift in an oblique direction of a liquid crystal apparatus incorporating the liquid crystal panel were measured. Table 4 shows the obtained properties.

EXAMPLE 7

A liquid crystal panel was produced in the same manner as in Example 1 except that the second optical element was changed from the polymer film G to the polymer film K. Then, a contrast ratio and color shift in an oblique direction of a liquid crystal apparatus incorporating the liquid crystal panel were measured. Table 4 shows the obtained properties.

EXAMPLE 8

A liquid crystal panel was produced in the same manner as in Example 1 except that: the second optical element was changed from the polymer film G to a laminate of two polymer films K; and the two polymer films K were laminated such that the respective slow axes were perpendicular to each other. Then, a contrast ratio in an oblique direction of a liquid crystal apparatus incorporating the liquid crystal panel was measured. Table 4 shows the obtained properties.

Comparative Example 1

A liquid crystal panel was produced in the same manner as in Example 1 except that the first optical element was changed from the retardation film A to the retardation film C. Then, a contrast ratio and color shift in an oblique direction of a liquid crystal apparatus incorporating the liquid crystal panel were measured. Table 4 shows the obtained properties.

Comparative Example 2

A liquid crystal panel was produced in the same manner as in Example 1 except that the first optical element was changed from the retardation film A to the retardation film E. Then, a contrast ratio and color shift in an oblique direction of a liquid crystal apparatus incorporating the liquid crystal panel were measured. Table 4 shows the obtained properties.

Comparative Example 3

A liquid crystal panel was produced in the same manner as in Example 1 except that the second optical element was changed from the polymer film G to the polymer film L. Then, a contrast ratio and color shift in an oblique direction of a liquid crystal apparatus incorporating the liquid crystal panel were measured. Table 4 shows the obtained properties.

Comparative Example 4

A liquid crystal panel was produced in the same manner as in Example 1 except that the second optical element was changed from the polymer film G to the polymer film M. Then, a contrast ratio and color shift in an oblique direction of a liquid crystal apparatus incorporating the liquid crystal panel were measured. Table 4 shows the obtained properties.

Comparative Example 5

Figure 8:
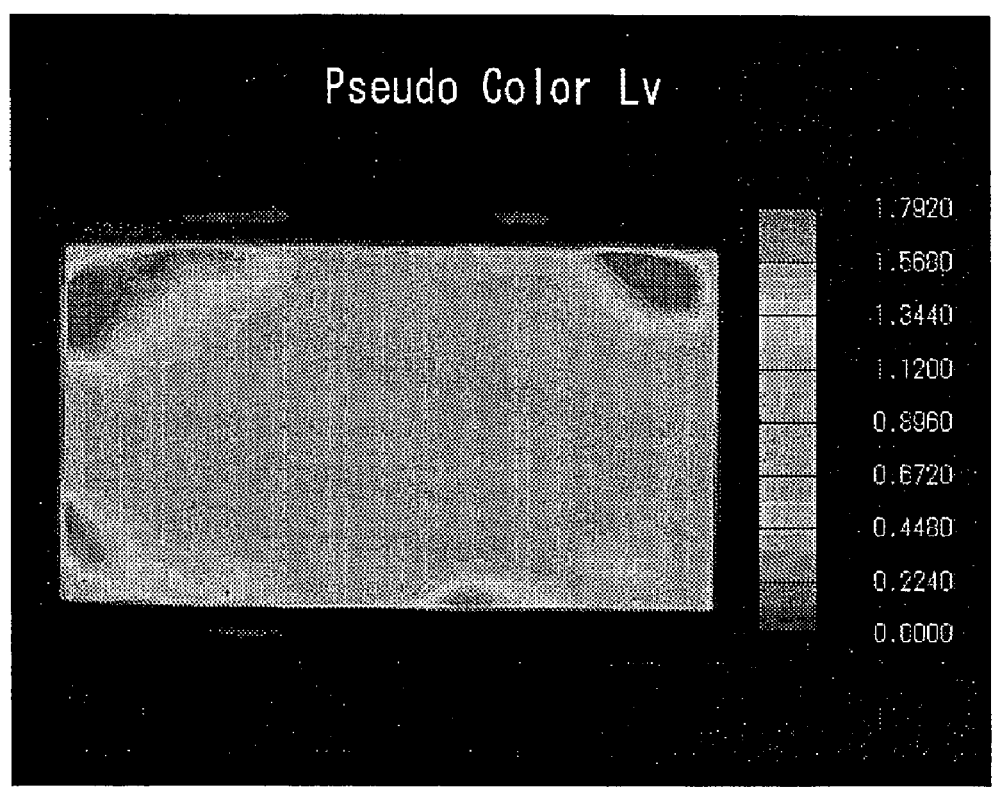
FIG. 8 is a photograph showing results of measurement of display unevenness of a liquid crystal cell according to Comparative Example 5.

A liquid crystal panel II was produced in the same manner as in Example 1 except that the first optical element was changed from the retardation film A to the retardation film F. The liquid crystal panel II was incorporated into the original liquid crystal display apparatus, and backlight was turned on for 8 hours. Then, a display screen of the liquid crystal display apparatus was photographed in a dark room by using a two-dimensional color distribution measurement apparatus "CA-1500" (manufactured by Konica Minolta Holdings, Inc.). As shown in FIG. 8, there was large display unevenness due to heat of backlight to a great extent.

TABLE 4

| | First optical element | | | Second optical element | | | Liquid crystal panel | | |
| --- | --- | --- | --- | --- | --- | --- | --- | --- | --- |
| | Retardation film | Re [590] (nm) | Rth [590]/ Re [590] | Optical film | Re [590] (nm) | Rth [590] (nm) | Contrast ratio in oblique direction | Color shift in oblique direction | Display uneven-ness |
| Example 1 | A | 270 | 0.50 | G | 0.1 | 1.0 | 88.0 | 0.24 | Good |
| Example 2 | B | 245 | 0.44 | G | 0.1 | 1.0 | 56.9 | 0.58 | Good |
| Example 3 | D (two films) | 290 | 0.50 | G | 0.1 | 1.0 | 61.5 | 0.41 | Good |
| Example 4 | E (two films) | 264 | 0.47 | G | 0.1 | 1.0 | 80.2 | 0.35 | Good |
| Example 5 | A | 270 | 0.50 | H | 1.0 | 2.0 | 85.7 | 0.25 | Good |
| Example 6 | A | 270 | 0.50 | J | 2.4 | 5.0 | 83.8 | 0.31 | Good |
| Example 7 | A | 270 | 0.50 | K | 5.0 | 10.0 | 77.1 | 0.53 | Good |
| Example 8 | A | 270 | 0.50 | K (two films) | 0.0 | 20.0 | 41.3 | 0.58 | Good |
| Comparative Example 1 | C | 219 | 0.39 | G | 0.1 | 1.0 | 13.2 | 0.83 | Good |
| Comparative Example 2 | E | 132 | 0.47 | G | 0.1 | 1.0 | 5.3 | 1.14 | Good |
| Comparative Example 3 | A | 270 | 0.50 | L | 2.2 | 39.8 | 12.3 | 1.29 | Good |
| Comparative Example 4 | A | 270 | 0.50 | M | 2.5 | 60.2 | 5.3 | 1.08 | Good |
| Comparative Example 5 | F | 284 | 0.48 | G | 0.1 | 1.0 | 87.5 | 0.91 | No good |

EXAMPLE 9

A shrinkable film "TORAYFAN BO2873" (trade name, available from Toray Industries, Inc.) was attached to both sides of a polymer film "ARTON FLZU130D0" (trade name, available from JSR Corporation, thickness of 130 μm) containing a resin obtained through hydrogenation of a ring-opened polymer of a norbornene-based monomer through an acrylic pressure sensitive adhesive layer. Then, the resultant was stretched 1.42 times in an air-circulating thermostatic oven at 146° C. by using a roll stretching machine while a longitudinal direction of the film was held, to thereby produce a retardation film N having a thickness of 143 μm. The retardation film N had the following optical properties: Re[590] of 269 nm; Rth[590] of 137 nm; Nz of 0.51; Re[480]/Re[590] of 1.0; and absolute value of photoelastic coefficient of $5.1 \times 10^{-12}$. The properties of the shrinkable film are shown in Table 1.

Next, a liquid crystal panel was taken out from a liquid crystal display apparatus (23-inch wide liquid crystal television "FLATRON CRL-23WA", trade name, manufactured by LG Electronics Inc.) including a liquid crystal cell of IPS mode. Polarizing plates arranged above and below the liquid crystal cell were removed, and glass surfaces (front and back surfaces) were washed.

Next, the retardation film N as a first optical element was laminated on a surface of the liquid crystal cell on a viewer side such that a longer side of the liquid crystal cell and a slow axis of the retardation film N were perpendicular to each other. Then, the polarizer P1 was laminated on the surface of the retardation film N such that the longer side of the liquid crystal cell and an absorption axis of the polarizer P1 were parallel to each other. At this time, the slow axis of the retardation film N and the absorption axis of the polarizer P1 were perpendicular (90°±0.5°) to each other. Then, a commercially available triacetyl cellulose film (trade name "UZ-TAC", thickness of 40 μm, available from Fuji Photo Film Co., Ltd.) was laminated on a surface of the polarizer P1 without the retardation film N laminated thereon.

Next, the polymer film G as a second optical element was laminated on the surface of the liquid crystal cell on a backlight side such that the longer side of the liquid crystal cell and a slow axis of the polymer film G were perpendicular to each other. Then, the polarizer P2 was laminated on the surface of the polymer film G such that the longer side of the liquid crystal cell and an absorption axis of the polarizer P2 were perpendicular to each other. At this time, the slow axis of the polymer film G and the absorption axis of the polarizer P2 were parallel (0°±0.5°) to each other. Then, a commercially available triacetyl cellulose film (trade name "UZ-TAC", thickness of 40 μm, available from Fuji Photo Film Co., Ltd.) was laminated on a surface of the polarizer P2 without the polymer film G laminated thereon, to thereby produce a liquid crystal panel III of O-mode. In the thus-produced liquid crystal panel III, the absorption axes of the polarizers P1 and P2 were perpendicular (90°±1.5°) to each other, and the absorption axis of the polarizer P2 and the initial alignment direction of the liquid crystal cell were parallel (0°±0.5°) to each other.

Figure 9:
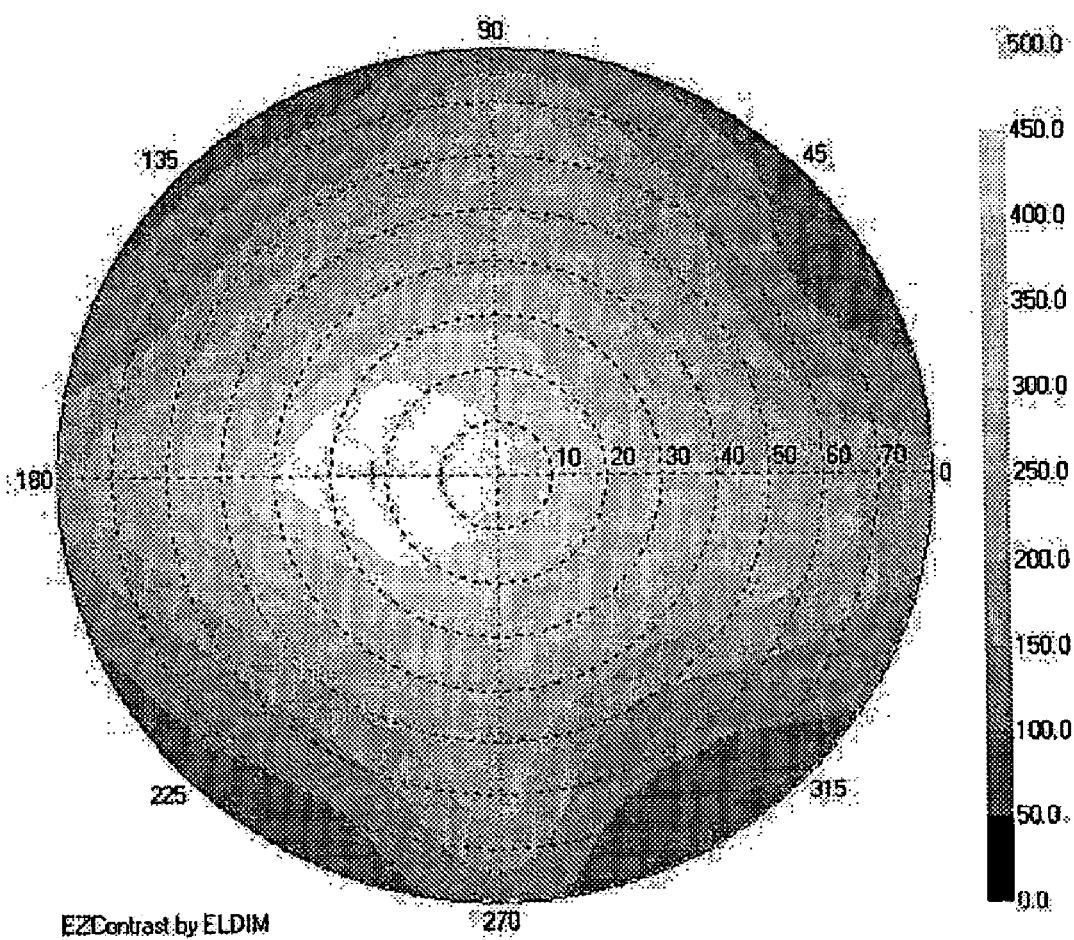
FIG. 9 is a contrast contour map of a liquid crystal panel according to Example 9 of the present invention.

The liquid crystal panel III was incorporated into the original liquid crystal display apparatus, and backlight was turned on. After 10 min, a contrast ratio and a Δxy value were measured in all azimuth directions (azimuth angles of 0° to 360°) at a polar angle of 0° (direction of a normal to the panel) to 780. A larger contrast ratio indicates better display properties. The Δxy value is a value calculated from the equation $\Delta xy = \{(0.31-x)^2 + (0.31-y)^2\}^{1/2}$, and represents a colored amount from pure black color. The Δxy value is an index showing a color shift of the liquid crystal display apparatus, and a smaller Δxy value represents better display properties. FIG. 9 is a contrast contour map of the liquid crystal panel III. The liquid crystal panel III had a maximum contrast ratio of 460, a minimum contrast ratio of 79.1, and an average contrast ratio of 280.6 at an azimuth angle of 45° and a polar angle of 0° to 78°. Further, the liquid crystal panel III had a maximum Δxy value of 0.085, a minimum Δxy value of 0.013, and an average Δxy value of 0.057 in all azimuth directions (azimuth angle of 0° to 360°) at a polar angle of 60°.

COMPARATIVE EXAMPLE 6

Figure 10:
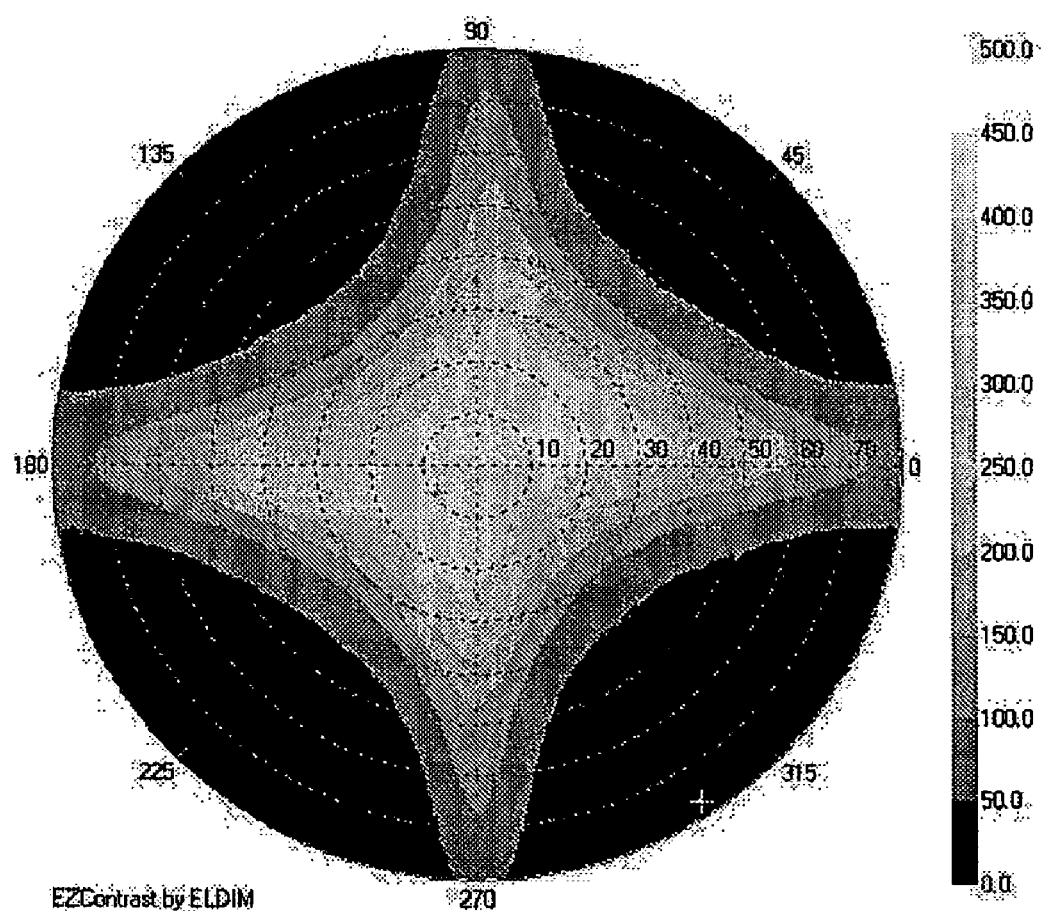
FIG. 10 is a contrast contour map of a liquid crystal panel according to Comparative Example 6 of the present invention.

A liquid crystal panel IV was produced in the same manner as in Example 9 except that the first optical element was not used. The liquid crystal panel IV was incorporated into the original liquid display apparatus, and backlight was turned on. After 10 min, a contrast ratio and a Δxy value were measured in all azimuth directions (azimuth angles of 0° to 360°) at a polar angle of 0° (direction of a normal to the panel) to 78°. FIG. 10 is a contrast contour map of the liquid crystal panel IV. The liquid crystal panel IV had a maximum contrast ratio of 381, a minimum contrast ratio of 11.4, and an average contrast ratio of 154.7 at an azimuth angle of 45° and a polar angle of 0° to 78°. Further, the liquid crystal panel IV had a maximum Δxy value of 0.14, a minimum Δxy value of 0.012, and an average Δxy value of 0.068 in all azimuth directions (azimuth angle of 0° to 360°) at a polar angle of 60°.

Figure 11:
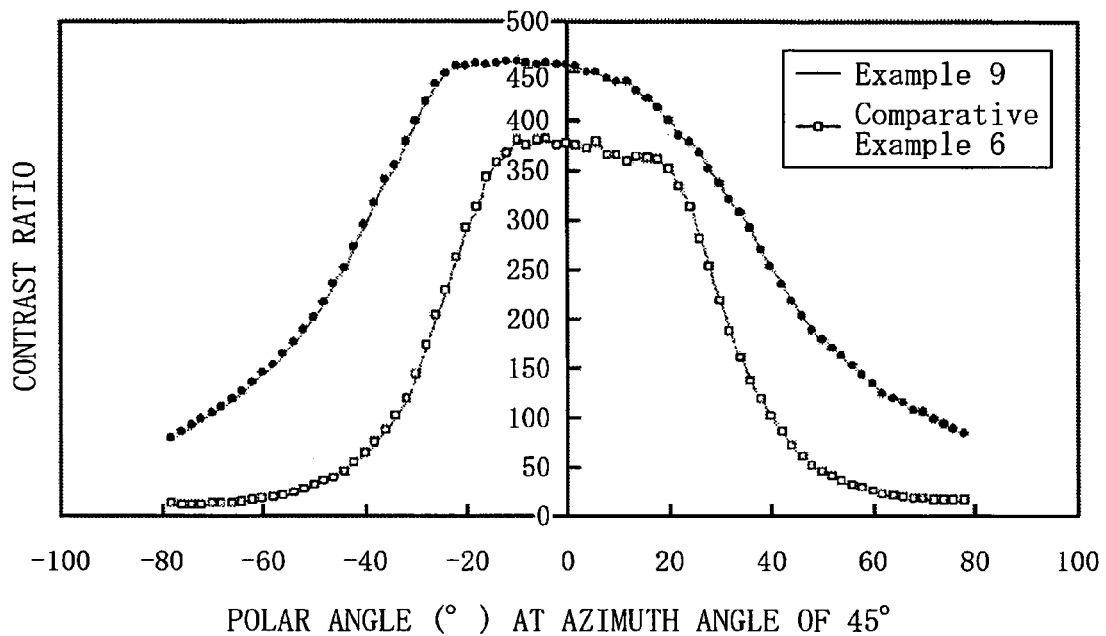
FIG. 11 is a graph showing a comparison between contrast ratios of the liquid crystal panels of Example 9 and Comparative Example 6.
Figure 12:
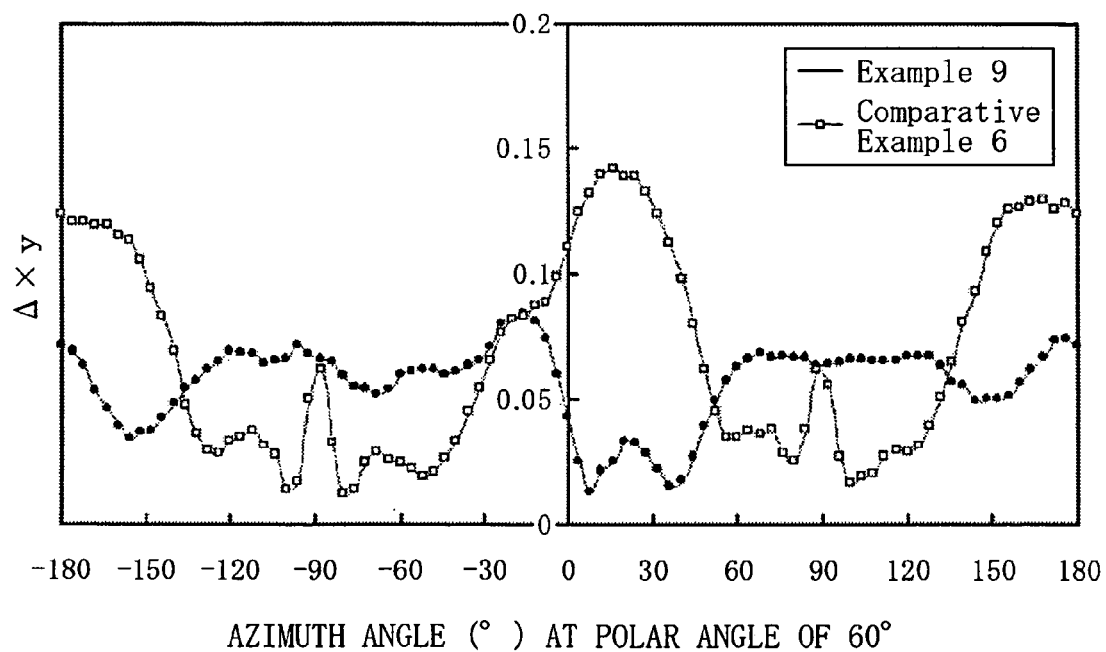
FIG. 12 is a graph showing a comparison between color shifts of the liquid crystal panels of Example 9 and Comparative Example 6.

Further, the contrast ratios of the liquid crystal panels III and IV were compared at an azimuth angle of 45° and a polar angle of 0° (direction of a normal to the panel) to 78°. FIG. 11 shows the results. The Δxy values of the liquid crystal panels III and IV were compared in all azimuth directions at a polar angle of 60°. FIG. 12 shows the results.

(Evaluation)

As shown in Examples 1 to 4, a liquid crystal display apparatus having a high contrast ratio in an oblique direction was obtained with the liquid crystal display apparatus including a second optical element having small retardation values and a first optical element having an Re[590] value within a range of 240 to 350 nm. Further, as shown in Examples 5 to 8, a liquid crystal display apparatus having a high contrast ratio in an oblique direction was obtained with the liquid crystal display apparatus including a second optical element having an Rth[590] value within a range of 0 to 20 nm. The liquid crystal display apparatus including the liquid crystal panel of Example 1 had very little display unevenness due to heat of backlight even when backlight was turned on for a long period of time. The liquid crystal display apparatus of each of Examples 2 to 8 had very little display unevenness, similar that of Example 1. However, Comparative Examples 1 to 4 each provided a liquid crystal display apparatus having a low contrast ratio in an oblique direction because the liquid crystal display apparatus included a first optical element and a second optical element each having retardation values out of the above ranges. Further, a liquid crystal display apparatus of Comparative Example 5 had display unevenness due to heat of backlight to a great extent because the retardation film with a large photoelastic coefficient obtained through a conventional technique was used.

FIGS. 11 and 12 clearly show that the liquid crystal display apparatus including the liquid crystal panel III obtained in Example 9 had excellent display properties of high contrast ratios in all azimuth directions, a small maximum color shift, and a small average color shift. In contrast, the liquid crystal display apparatus including the liquid crystal panel IV obtained in Comparative Example 6 had display properties of low contrast ratios in all azimuth directions, a large maximum color shift, and a large average color shift.

As described above, the liquid crystal panel of the present invention has enhanced contrast ratio in an oblique direction and reduced color shift in an oblique direction, and thus is very useful for improvement in display properties of the liquid crystal display apparatus. Therefore, the liquid crystal panel of the present invention may suitably be used for a liquid crystal display apparatus or a liquid crystal television.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A liquid crystal panel comprising:
   a liquid crystal cell including a liquid crystal layer containing homogeneously aligned liquid crystal molecules in the absence of an electric field;
   a polarizer arranged on both sides of the liquid crystal cell;
   a first optical element arranged between one polarizer and the liquid crystal cell; and
   a second optical element arranged between the other polarizer and the liquid crystal cell, wherein:
   the first optical element comprises a retardation film containing a norbornene-based resin, has a refractive index profile of nx >nz >ny, and satisfies the following expressions (1) and (2); and
   the second optical element has substantially optical isotropy:

$$240 \text{ nm} \leq Re[590] \leq 350 \text{ nm} \tag{1}$$

$$0.20 \leq Rth[590]/Re[590] \leq 0.80 \tag{2}$$

2. A liquid crystal panel according to claim 1, wherein the first optical element has a slow axis which is one of substantially parallel and substantially perpendicular to an absorption axis of one polarizer.

3. A liquid crystal panel according to claim 1, wherein the liquid crystal cell has a refractive index profile of nx>ny=nz.

4. A liquid crystal panel according to claim 3, wherein the liquid crystal cell comprises one of IPS mode, FFS mode, and FLC mode.

5. A liquid crystal panel according to claim 1, wherein an initial alignment direction of the liquid crystal cell is substantially parallel to a direction of an absorption axis of the polarizer on a side where the second optical element is arranged.

6. A liquid crystal panel according to claim 5, wherein the initial alignment direction of the liquid crystal cell is substantially parallel to a direction of an absorption axis of the polarizer arranged on a backlight side of the liquid crystal cell.

7. A liquid crystal panel according to claim 5, wherein the initial alignment direction of the liquid crystal cell is substantially perpendicular to a direction of an absorption axis of the polarizer arranged on a backlight side of the liquid crystal cell.

8. A liquid crystal panel according to claim 1, wherein the first optical element has wavelength dispersion property of 0.81 to 1.10.

9. A liquid crystal panel according to claim 1, wherein the first optical element comprises a single retardation film containing a norbornene-based resin.

10. A liquid crystal panel according to claim 1, wherein the first optical element comprises a laminate including the retardation film containing a norbornene-based resin.

11. A liquid crystal panel according to claim 1, wherein the norbornene-based resin contains a ring-opened polymer and/or ring-opened copolymer of a norbornene-based monomer.

12. A liquid crystal panel according to claim 11, wherein the norbornene-based resin contains a resin obtained through hydrogenation of the ring-opened polymer or ring-opened copolymer of the norbornene-based monomer and containing at least repeating units represented by the general formulae (I), (II), and/or (III):

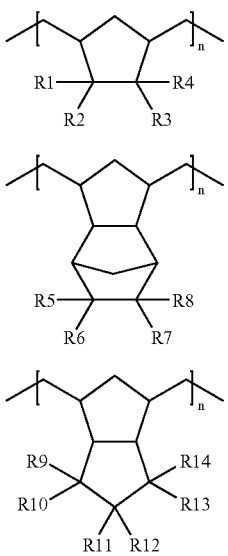

in the general formulae (I), (II), and (III): R1 to R14 each independently represent hydrogen, a halogen, a halogenated alkyl group, an alkyl group having 1 to 4 carbon atoms, an alkylidene group having 1 to 4 carbon atoms, an alkenyl group having 1 to 4 carbon atoms, an alkoxycarbonyl group having 1 to 4 carbon atoms, an aryl group, an aralkyl group, an aralkyloxy group, a hydroxyalkyl group, a cyano group, a cycloalkyl group having 4 to 10 carbon atoms, an acyloxy group, or substituted derivatives thereof and n represents an integer of 2 or more.

13. A liquid crystal panel according to claim 1, wherein the retardation film has an absolute value of photoelastic coefficient measured by using light of a wavelength of 590 nm at 23° C. of $2.0 \times 10^{-13}$ to $2.0 \times 10^{-11}$ $m^2/N$.

14. A liquid crystal panel according to claim 1, wherein the second optical element satisfies the following expressions (3) and (4):

$$0 \text{ nm} \leq Re[590] \leq 10 \text{ nm} \quad (3)$$

$$-10 \text{ nm} \leq Rth[590] \leq 20 \text{ nm} \quad (4).$$

15. A liquid crystal panel according to claim 1, wherein the second optical element comprises at least one polymer film selected from the group consisting of a cellulose-based resin, a norbornene-based resin, and a resin containing an alternating copolymer of isobutylene and N-methylmaleimide and an acrylonitrile/styrene copolymer.

16. A liquid crystal panel according to claim 1, wherein the second optical element comprises a laminate film prepared by laminating a negative C plate satisfying the following expressions (7) and (8), and a positive C plate satisfying the following expressions (9) and (10):

$$0 \text{ nm} < Re[590] \leq 10 \text{ nm} \quad (7)$$

$$20 \text{ nm} < Rth[590] \leq 400 \text{ nm} \quad (8)$$

$$0 \text{ nm} < Re[590] \leq 10 \text{ nm} \quad (9)$$

$$-400 \text{ nm} \leq Rth[590] < -20 \text{ nm} \quad (10).$$

17. A liquid crystal panel according to claim 1, further comprising a protective film on an outer side of each polarizer.

18. A liquid crystal television comprising the liquid crystal panel of claim 1.

19. A liquid crystal display apparatus comprising the liquid crystal panel of claim 1.

* * * * *